US012145363B2

(12) United States Patent
Watanabe et al.

(10) Patent No.: US 12,145,363 B2
(45) Date of Patent: Nov. 19, 2024

(54) LIQUID EJECTION APPARATUS

(71) Applicant: SEIKO EPSON CORPORATION, Tokyo (JP)

(72) Inventors: Yuki Watanabe, Matsumoto (JP); Akira Miyagishi, Shiojiri (JP); Akinori Taniuchi, Matsumoto (JP)

(73) Assignee: SEIKO EPSON CORPORATION (JP)

( * ) Notice: Subject to any disclaimer, the term of this patent is extended or adjusted under 35 U.S.C. 154(b) by 240 days.

(21) Appl. No.: 17/949,304

(22) Filed: Sep. 21, 2022

(65) Prior Publication Data

US 2023/0089063 A1 Mar. 23, 2023

(30) Foreign Application Priority Data

Sep. 22, 2021 (JP) ................................ 2021-154345

(51) Int. Cl.
*B41J 2/045* (2006.01)

(52) U.S. Cl.
CPC ....... *B41J 2/04588* (2013.01); *B41J 2/04581* (2013.01); *B41J 2/04596* (2013.01)

(58) Field of Classification Search
CPC ......................... B41J 2/04588; B41J 2/04581; B41J 2/04596; B41J 2002/14241; B41J 2002/14419; B41J 2/04541; B41J 2/04593; B41J 2/14233; B41J 2202/12
See application file for complete search history.

(56) References Cited

U.S. PATENT DOCUMENTS

2009/0289976 A1* 11/2009 Nishimura ............. B41J 2/1707 347/89
2019/0366714 A1 12/2019 Tsukahara et al.

FOREIGN PATENT DOCUMENTS

JP H11-314360 A 11/1999
JP 2009-279816 A 12/2009
JP 2016-016614 A 2/2016
JP 2018-103602 A 7/2018

* cited by examiner

*Primary Examiner* — Bradley W Thies
(74) *Attorney, Agent, or Firm* — Harness, Dickey & Pierce, P.L.C.

(57) ABSTRACT

A liquid ejection apparatus is configured to control a supply of a drive signal to a drive element by a controller so that a target period is either an ejection period or a non-ejection period based on print data. The drive signal includes an ejection pulse and a non-ejection pulse. The controller: does not supply the non-ejection pulse to the drive element when the target period is the non-ejection period and an elapsed time length from the last ejection period is less than the predetermined time length, and supplies the non-ejection pulse to the drive element when the target period is the non-ejection period and the elapsed time length is equal to or longer than the predetermined time length. The predetermined time length is an integral multiple or more of ½ of a natural vibration cycle of a meniscus of a liquid in the nozzle.

14 Claims, 15 Drawing Sheets

LIQUID EJECTION APPARATUS

The present application is based on, and claims priority from JP Application Serial Number 2021-154345, filed Sep. 22, 2021, the disclosure of which is hereby incorporated by reference herein in its entirety.

BACKGROUND

1. Technical Field

The present disclosure relates to a liquid ejection apparatus.

2. Related Art

A liquid ejection apparatus represented by an ink jet printer generally has a liquid ejection head that ejects a liquid such as an ink. The liquid ejection head includes, for example, as disclosed in JP-A-2018-103602, a pressure chamber, a first flow path through which a liquid is supplied to the pressure chamber, and a second flow path through which the liquid is discharged from the pressure chamber, a nozzle from which the liquid from the second flow path is ejected and a drive element that gives a pressure fluctuation to the liquid in the pressure chamber according to a drive signal.

JP-A-2018-103602 discloses a configuration in which a liquid in a flow path including the pressure chamber, the first flow path and the second flow path is circulated.

In JP-A-2018-103602, a drive signal is not supplied to the drive element corresponding to the nozzle during the period during which the liquid is not ejected. Moreover, the nozzle branches from the second flow path and extends in a direction different from that of the second flow path. Therefore, even when the liquid is circulated as described above, the liquid in the nozzle tends to stay during the period during which the liquid is not ejected. As a result, a nozzle for which the liquid is not ejected for a long period of time may have an ejection failure due to the thickening of the liquid.

SUMMARY

According to an aspect of the present disclosure, a liquid ejection apparatus includes a pressure chamber, a first flow path through which a liquid is supplied to the pressure chamber, a second flow path through which a liquid is discharged from the pressure chamber, a nozzle that branches off from the second flow path and ejects a liquid, a drive element that gives pressure fluctuations to a liquid in the pressure chamber according to a drive signal, a drive signal generation unit that generates the drive signal, and a controller that controls a supply of the drive signal to the drive element so that a target period is either an ejection period during which a liquid is ejected from the nozzle or a non-ejection period during which a liquid is not ejected from the nozzle per unit period of a predetermined cycle based on print data, wherein the drive signal includes an ejection pulse that drives the drive element so as to cause, in the pressure chamber, a pressure fluctuation of a strength with which a liquid is ejected from the nozzle and a non-ejection pulse that drives the drive element so as to cause, in the pressure chamber, a pressure fluctuation of a strength with which a liquid is not ejected from the nozzle, wherein when a time length that is q times or more ½ of a natural vibration cycle of a meniscus of a liquid in the nozzle is set as a predetermined time length where q is an integer of one or more, the controller supplies the ejection pulse to the drive element in a case in which the target period is the ejection period, supplies neither the ejection pulse nor the non-ejection pulse to the drive element in a case in which the target period is the non-ejection period and an elapsed time length from the last ejection period before the target period is less than the predetermined time length, and dose not supply the ejection pulse but supplies the non-ejection pulse to the drive element in a case in which the target period is the non-ejection period and the elapsed time length is equal to or longer than the predetermined time length.

DESCRIPTION OF EXEMPLARY EMBODIMENTS

Figure 1:
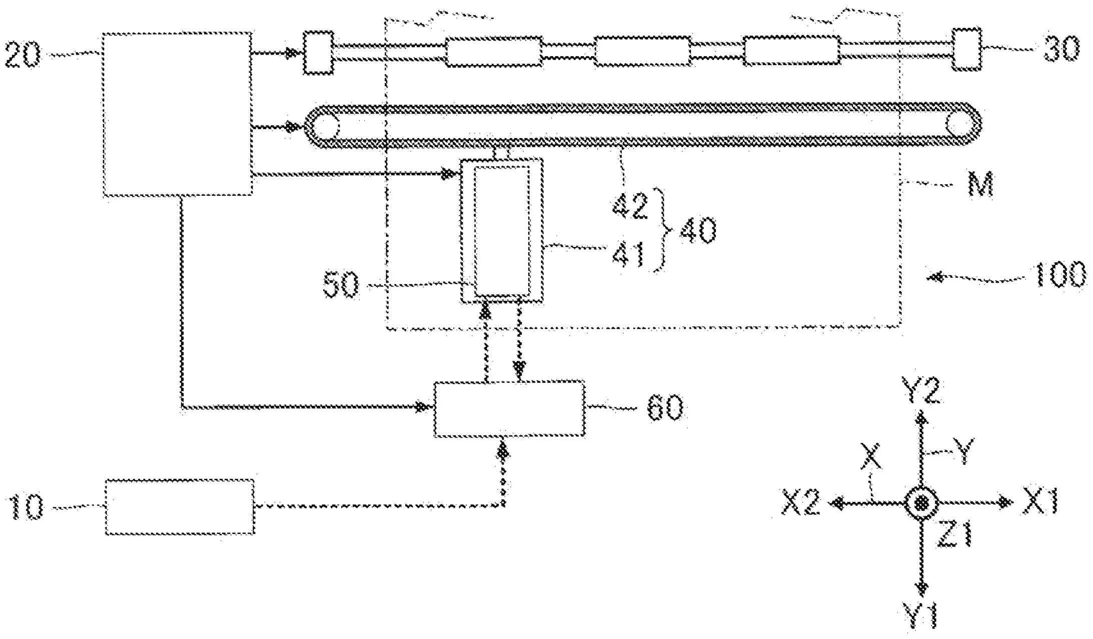
FIG. 1 is a schematic diagram showing a configuration example of a liquid ejection apparatus according to the first embodiment.

Hereinafter, preferred embodiments according to the present disclosure will be described with reference to the accompanying drawings. In the drawings, the dimensions and scales of each part are appropriately different from the actual ones, and some parts are schematically shown for easy understanding. Further, the scope of the present disclosure is not limited to these forms unless it is stated in the following description that the present disclosure is particularly limited.

In the following description, the X axis, the Y axis and the Z axis that intersect each other will be appropriately used. Further, in the following, one direction along the X axis represents the X1 direction, and the direction opposite to the X1 direction represents the X2 direction. Similarly, the directions opposite to each other along the Y axis are the Y1 direction and the Y2 direction. The directions opposite to each other along the Z axis are the Z1 direction and the Z2 direction.

Here, typically, the Z axis is a vertical axis, and the Z2 direction corresponds to a downward direction in the vertical direction. However, the Z axis may not be a vertical axis. The X axis, the Y axis, and the Z axis are typically orthogonal to each other, but are not limited to this, and may intersect at an angle within a range of 80° or more and 100° or less, for example.

A: First Embodiment

A1: Overall Configuration of Liquid Ejection Apparatus

FIG. 1 is a schematic diagram showing a configuration example of a liquid ejection apparatus 100 according to the first embodiment. The liquid ejection apparatus 100 is an ink jet printing apparatus that ejects a liquid such as ink as droplets onto a medium M. The medium M is, for example, printing paper. The medium M is not limited to printing paper, and may be a printing target made of any material such as a resin film or fabric cloth.

As shown in FIG. 1, the liquid ejection apparatus 100 includes a liquid container 10, a control unit 20, a transport mechanism 30, a movement mechanism 40, a liquid ejection head 50, and a circulation mechanism 60.

The liquid container 10 stores an ink. Specific forms of the liquid container 10 include, for examples, a cartridge that can be attached to and detached from the liquid ejection apparatus 100, a bag-shaped ink pack made of a flexible film, and an ink tank that can be refilled with the ink. Any type of ink is stored in the liquid container 10.

The control unit 20 controls the operation of each element of the liquid ejection apparatus 100. The control unit 20 includes, for example, one or a plurality of processing circuits such as a central processing unit (CPU) or a field programmable gate array (FPGA) and one or a plurality of storage circuits such as a semiconductor memory. The detailed configuration of the control unit 20 will be described later with reference to FIG. 2.

The transport mechanism 30 transports the medium M in the Y1 direction under the control of the control unit 20. The movement mechanism 40 reciprocates the liquid ejection head 50 along the X axis under the control of the control unit 20. The movement mechanism 40 includes a substantially box-shaped carriage 41 that accommodates the liquid ejection head 50, and an endless transport belt 42 to which the carriage 41 is fixed. The number of liquid ejection heads 50 mounted on the carriage 41 is not limited to one, but may be a plural. Further, in addition to the liquid ejection head 50, the above-mentioned liquid container 10 may be mounted on the carriage 41.

Under the control of the control unit 20, the liquid ejection head 50 ejects the ink supplied from the liquid container 10 to the medium M from each of the plurality of nozzles. An image is formed by the ink on the surface of the medium M by performing this ejection with the transport of the medium M by the transport mechanism 30 and the reciprocating movement of the liquid ejection head 50 by the movement mechanism 40 in parallel.

The liquid container 10 is coupled to the liquid ejection head 50 via the circulation mechanism 60. The circulation mechanism 60 supplies the ink to the liquid ejection head 50 under the control of the control unit 20, and collects the ink discharged from the liquid ejection head 50 for resupply to the liquid ejection head 50. By the operation of the circulation mechanism 60, it is possible to suppress an increase in the viscosity of the ink and reduce the retention of air bubbles in the ink. The detailed configuration of the circulation mechanism 60 will be described later with reference to FIG. 3.

A2: Electrical Configuration of Liquid Ejection Apparatus

Figure 2:
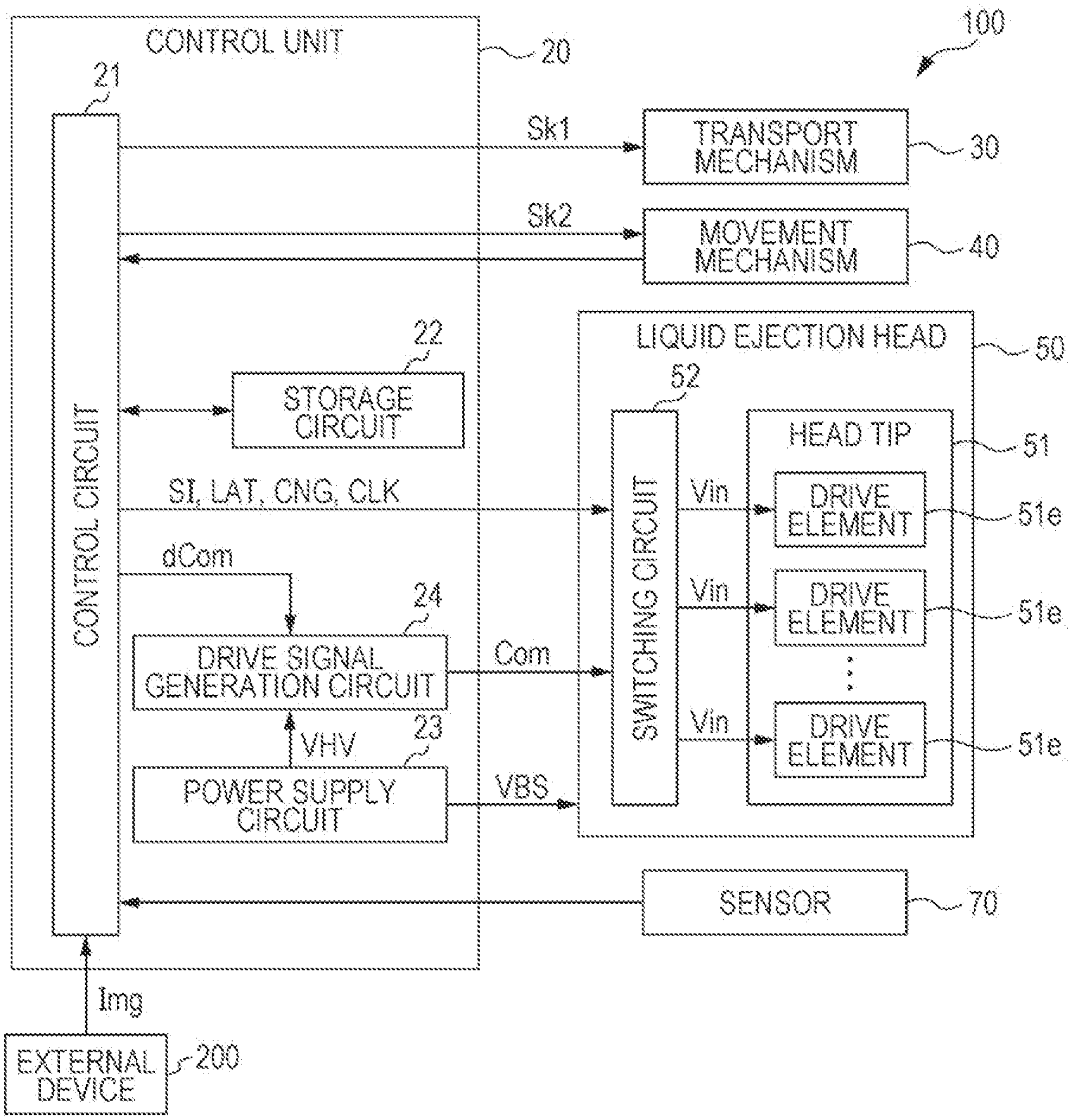
FIG. 2 is a diagram showing an electrical configuration of the liquid ejection apparatus according to the first embodiment.

FIG. 2 is a diagram showing an electrical configuration of the liquid ejection apparatus 100 according to the first embodiment. Hereinafter, the control unit 20 will be described with reference to FIG. 2, but prior to this, the liquid ejection head 50 will be briefly described.

As shown in FIG. 2, the liquid ejection head 50 includes a head chip 51 and a switching circuit 52.

The head chip 51 includes a plurality of drive elements **51*e*, and the ink is ejected from the nozzles by appropriately driving the plurality of drive elements 51*e*. Here, each drive element 51*e* receives the supply of a supply signal Vin and applies pressure to the ink. The details of the head chip 51 will be described later with reference to FIGS. 3 to 5**.

Under the control of the control unit 20, the switching circuit 52 switches whether to supply a drive signal Com output from the control unit 20 as the supply signal Vin for each of the plurality of drive elements **51*e* of the head chip 51. The details of the switching circuit 52 will be described later with reference to FIGS. 6 to 8**.

In the example shown in FIG. 2, the number of head chips 51 included in the liquid ejection head 50 is one, but the number is not limited to this, and the number of head chips 51 included in the liquid ejection head 50 may be two or more. In the following, when the number of nozzles N of the head chip 51 is M, the subscript [m] may be used to refer a drive element **51*e* as a drive element 51*e*[m] to distinguish each of the M drive elements 51*e* or M sets of drive elements 51*e* corresponding to the M nozzles. M is a natural number of one or more, and m is a natural number of one or more and M or less. Further, in the liquid ejection apparatus 100, M other components or M signals corresponding to the nozzles N or the drive elements 51*e* each may have a correspondence relationship with the nozzle N or the drive element 51*e***[m] by using the subscript [m].

As shown in FIG. 2, the control unit 20 includes a control circuit 21, a storage circuit 22, a power supply circuit 23, and a drive signal generation circuit 24.

The control circuit 21 has a function of controlling the operation of each unit of the liquid ejection apparatus 100 and a function of processing various pieces of data. The control circuit 21 includes a processor such as at least one central processing unit (CPU). Instead of a CPU, or in addition to the CPU, the control circuit 21 may include a programmable logic device such as a field-programmable gate array (FPGA). When the control circuit 21 is composed of a plurality of processors, the plurality of processors may be mounted on different substrates or the like.

The storage circuit 22 stores various programs executed by the control circuit 21 and various pieces of data such as print data Img processed by the control circuit 21. The storage circuit 22 includes a semiconductor memory of one or both of, for example, a volatile memory such as a random access memory (RAM) and a nonvolatile memory such as a read only memory (ROM), an electrically erasable programmable read-only memory (EEPROM), or a programmable read only memory (PROM). The print data Img is supplied from an external device 200 such as a personal computer or a digital camera. The storage circuit 22 may be configured as part of the control circuit 21.

The power supply circuit 23 receives power from a commercial power supply (not shown) and generates various predetermined potentials. The various electric potentials generated are appropriately supplied to each unit of the liquid ejection apparatus 100. For example, the power supply circuit 23 generates a power supply potential VHV and an offset potential VBS. The offset potential VBS is supplied to the liquid ejection head 50. Further, the power supply potential VHV is supplied to the drive signal generation circuit 24.

The drive signal generation circuit 24 is a circuit that generates a drive signal Com for driving each drive element 51*e*. Specifically, the drive signal generation circuit 24 includes, for example, a DA conversion circuit and an amplifier circuit. In the drive signal generation circuit 24, the DA conversion circuit converts a waveform designation signal dCom from the control circuit 21 from a digital signal to an analog signal, and the amplifier circuit amplifies the analog signal using the power supply potential VHV from the power supply circuit 23 to generate the drive signal Com. Here, among the waveforms included in the drive signal Com, the signal of the waveform actually supplied to the drive element 51*e* is the above-mentioned supply signal Vin. The waveform designation signal dCom is a digital signal for specifying the waveform of the drive signal Com.

The control circuit 21 controls the operations of respective components of the liquid ejection apparatus 100 by executing a program stored in the storage circuit 22. Here, the control circuit 21 executes the program to generates, as a signal for controlling the operation of each component of the liquid ejection apparatus 100, control signals Sk1 and Sk2, a print data signal SI, the waveform designation signal dCom, a latch signal LAT, a change signal CNG and a clock signal CLK.

The control signal Sk1 is a signal for controlling the drive of the transport mechanism 30. The control signal Sk2 is a signal for controlling the drive of the movement mechanism 40. The print data signal SI is a digital signal for designating the operating state of the drive element 51*e*. In combination with the print data signal SI, the latch signal LAT and the change signal CNG are timing signals that define the ink ejection timing from each nozzle of the head chip 51. These timing signals are generated, for example, based on the output of the encoder that detects the position of the carriage 41 described above.

A3: Flow Path of Liquid Ejection Head

Figure 3:
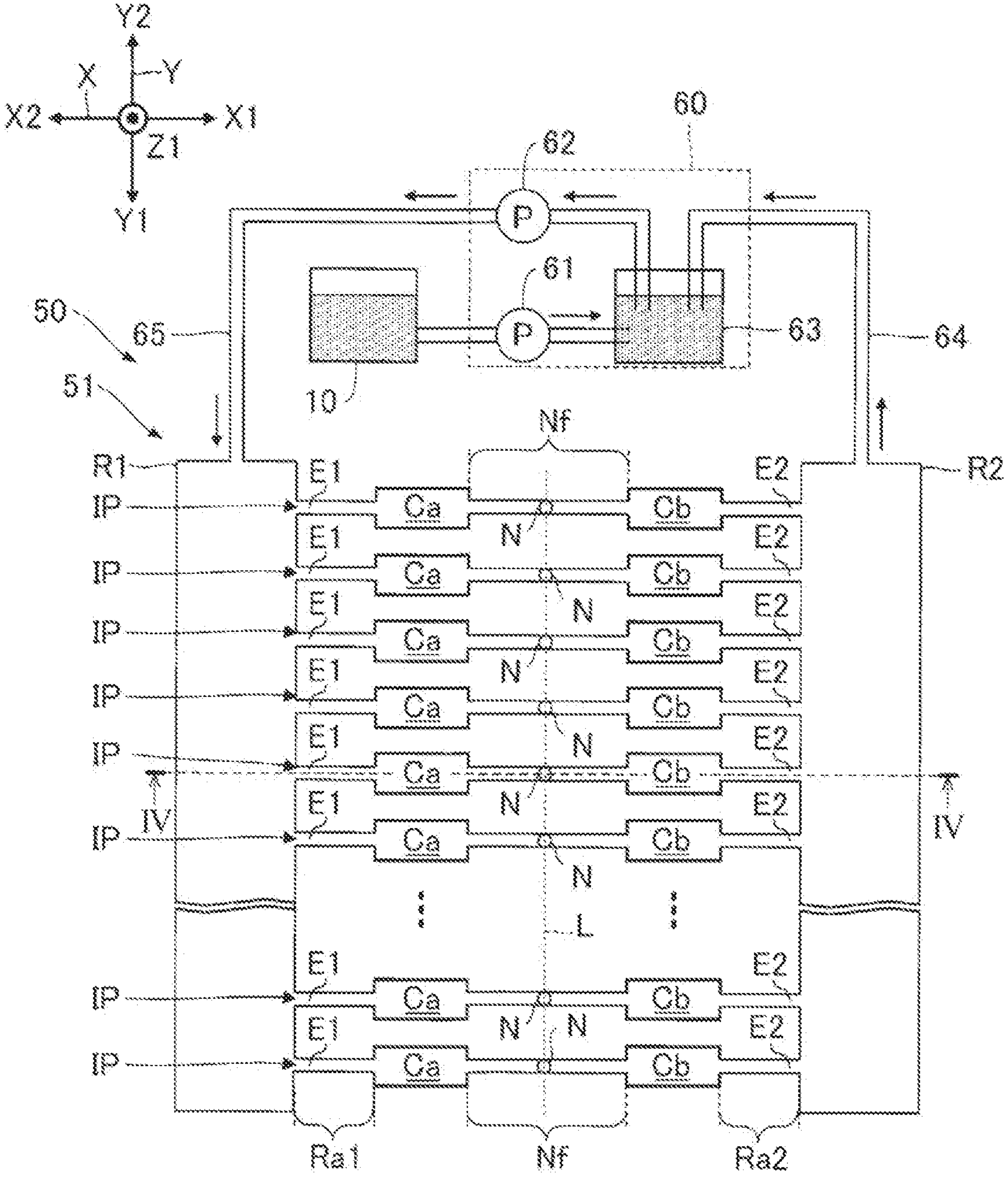
FIG. 3 is a schematic diagram for explaining a circulation flow path of a liquid ejection head.

FIG. 3 is a schematic diagram for explaining a circulation flow path of a liquid ejection head 50. As shown in FIG. 3, the liquid ejection head 50 includes a plurality of nozzles N, a plurality of individual flow paths IP, a first common liquid chamber R1, and a second common liquid chamber R2, and the circulation mechanism 60 is coupled to the first common liquid chamber R1 and the second common liquid chamber R2.

The plurality of nozzles N is disposed along the Y axis. Each of the plurality of nozzles N ejects the ink in the Z2 direction. Here, a set of the plurality of nozzles N constitutes a nozzle row L. Further, the plurality of nozzles N is disposed at equal intervals.

The individual flow path IP communicates with each of the plurality of nozzles N. Each of the plurality of individual flow paths IP extends along the X axis and communicates with different nozzles N. Further, the plurality of individual flow paths IP is disposed along the Y axis.

As shown in FIG. 3, each individual flow path IP includes a pressure chamber Ca, a pressure chamber Cb, a communication flow path Nf, which is an example of a "second flow path", an individual supply flow path Ra1, which is an example of a "first flow path", and an individual discharge flow path Ra2.

Each of the pressure chamber Ca and the pressure chamber Cb in each individual flow path IP extends along the X axis, and is a space in which the ink ejected from the nozzle N communicating with the individual flow path IP is stored. In the example shown in FIG. 3, the plurality of pressure chambers Ca is disposed along the Y axis. Similarly, the plurality of pressure chambers Cb is disposed along the Y axis. In each individual flow path IP, the positions of the pressure chamber Ca and the pressure chamber Cb in the direction along the Y axis are the same in the example shown in FIG. 3, but may be different from each other. Further, in the following, when the pressure chamber Ca and the pressure chamber Cb are not particularly distinguished, they are also simply referred to as a "pressure chamber C". Further, as will be described later, the drive element 51*e* is provided corresponding to each of the pressure chambers Ca and Cb, and in the present embodiment, M sets of drive elements 51*e* each set consisting of two drive elements 51*e* are used.

The communication flow path Nf is disposed between the pressure chamber Ca and the pressure chamber Cb in each individual flow path IP. In each individual flow path IP, the communication flow path Nf is a flow path that allows the pressure chamber Ca and the pressure chamber Cb to communicate with each other. Further, the plurality of communication flow paths Nf is disposed along the Y axis at intervals from each other. The nozzle N is provided in each communication flow path Nf. In each communication flow path Nf, the ink is ejected from the nozzle N due to the pressure fluctuation in the pressure chamber Ca and the pressure chamber Cb described above.

Each individual flow path IP includes the individual supply flow path Ra1 disposed between the pressure chamber Ca and the first common liquid chamber R1. The individual supply flow path Ra1 is a flow path that allows the pressure chamber Ca and the first common liquid chamber R1 to communicate with each other. Similarly, each individual flow path IP includes the individual discharge flow path Ra2 disposed between the pressure chamber Cb and the second common liquid chamber R2. The individual discharge flow path Ra2 is a flow path that allows the pressure chamber Cb and the second common liquid chamber R2 to communicate with each other.

Each of the first common liquid chamber R1 and the second common liquid chamber R2 commonly communicate with the plurality of individual flow paths IP. Each of the first common liquid chamber R1 and the second common liquid chamber R2 is a space extending along the Y axis over the entire range in which the plurality of nozzles N is distributed. The plurality of individual flow paths IP is located between the first common liquid chamber R1 and the second common liquid chamber R2 in the direction along the Z axis.

Here, the first common liquid chamber R1 is coupled to an end E1 of each individual flow path IP in the X2 direction. The ink that is supplied to each individual flow path IP is stored in the first common liquid chamber R1. On the other hand, the second common liquid chamber R2 is coupled to an end E2 of each individual flow path IP in the X1 direction.

The ink that is discharged from each individual flow path IP without being supplied for ejection is stored in the second common liquid chamber R2.

The circulation mechanism 60 is coupled to the first common liquid chamber R1 and the second common liquid chamber R2. The circulation mechanism 60 supplies the ink to the first common liquid chamber R1 and collects the ink discharged from the second common liquid chamber R2 for the resupply to the first common liquid chamber R1. The circulation mechanism 60 includes a first supply pump 61, a second supply pump 62, a storage container 63, a collection flow path 64, and a supply flow path 65.

The first supply pump 61 is a pump that supplies the ink stored in the liquid container 10 to the storage container 63. The storage container 63 is a sub tank that temporarily stores the ink supplied from the liquid container 10. The collection flow path 64 is a flow path that allows the second common liquid chamber R2 and the storage container 63 to communicate with each other, and through which the ink from the second common liquid chamber R2 is collected to the storage container 63. The ink stored in the liquid container 10 is supplied to the storage container 63 from the first supply pump 61, and the ink discharged from each individual flow path IP to the second common liquid chamber R2 is supplied to the storage container 63 through the collection flow path 64. The second supply pump 62 is a pump that delivers the ink stored in the storage container 63. The supply flow path 65 communicates the first common liquid chamber R1 and the storage container 63, and is a flow path for supplying the ink from the storage container 63 to the first common liquid chamber R1.

A4: Specific Structure of Head Chip

Figure 4:
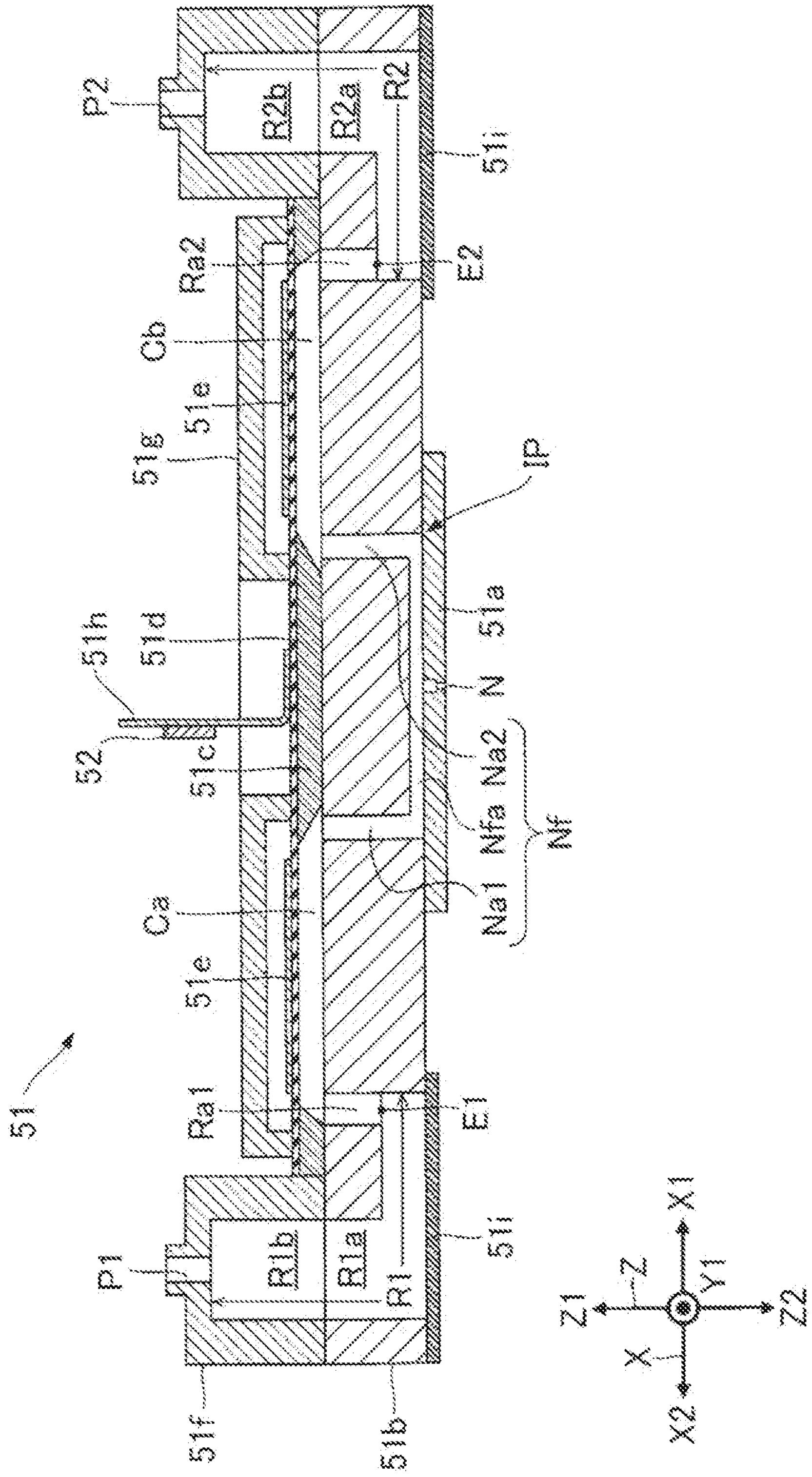
FIG. 4 is a cross-sectional view taken along line IV-IV in FIG. 3.

FIG. 4 is a sectional view taken along line IV-IV in FIG. 3. FIG. 4 shows a cross section of the head chip 51 cut in a plane orthogonal to the Y axis along the individual flow path IP. As shown in FIG. 4, the head chip 51 includes a nozzle substrate 51*a*, a flow path substrate 51*b*, a pressure chamber substrate 51*c*, a vibration plate 51*d*, a plurality of drive elements 51*e*, a case 51*f*, a protective plate 51*g*, and a wiring substrate 51*h*.

The nozzle substrate 51*a*, the flow path substrate 51*b*, the pressure chamber substrate 51*c*, and the vibration plate 51*d* are layered in this order in the Z1 direction. Each of these members extends along the Y axis and is manufactured, for example, by processing a silicon single crystal substrate using a semiconductor processing technique. Further, these members are joined to each other by an adhesive or the like. In addition, another layer such as an adhesive layer or a substrate may be appropriately interposed between two adjacent members among these members.

The nozzle substrate 51*a* is provided with the plurality of nozzles N. Each of the plurality of nozzles N is a through hole that extends along the Z axis and penetrates the nozzle substrate 51*a*, and through which the ink passes.

The flow path substrate 51*b* has a portion, of each of the plurality of individual flow paths IP described above, other than the pressure chamber Ca and the pressure chamber Cb, and a liquid chamber R1*a* that is part of the first common liquid chamber R1 and a liquid chamber R2*a* that is part of the second common liquid chamber R2. That is, the flow path substrate 51*b* has the communication flow path Nf, the individual supply flow path Ra1, the individual discharge flow path Ra2, the liquid chamber R1*a*, and the liquid chamber R2*a*.

Each of the liquid chamber R1*a* and the liquid chamber R2*a* is a space penetrating the flow path substrate 51*b*. A vibration absorber 51*i* that closes the opening of the space is installed on the face, of the flow path substrate 51*b*, facing the Z2 direction.

The vibration absorber 51*i* is a layered member made of an elastic material. The vibration absorber 51*i* constitutes part of the wall face of each of the first common liquid chamber R1 and the second common liquid chamber R2, and absorbs the pressure fluctuation in the first common liquid chamber R1 and the second common liquid chamber R2.

The communication flow path Nf has a first communication flow path Na1, a second communication flow path Na2, and a nozzle flow path Nfa. Each of the first communication flow path Na1 and the second communication flow path Na2 is a space penetrating the flow path substrate 51*b*. The first communication flow path Na1 and the second communication flow path Na2 communicate with each other via the nozzle flow path Nfa. The first communication flow path Na1 allows the pressure chamber Ca and the nozzle flow path Nfa to communicate with each other. The second communication flow path Na2 allows the pressure chamber Cb and the nozzle flow path Nfa to communicate with each other. The nozzle flow path Nfa is a space in the groove provided on the face, of the flow path substrate 51*b*, facing the Z2 direction, and extends along the X axis. Here, the nozzle substrate 51*a* constitutes part of the wall face of the nozzle flow path Nfa.

Each of the individual supply flow path Ra1 and the individual discharge flow path Ra2 is a space penetrating the flow path substrate 51*b*. The individual supply flow path Ra1 allows the first common liquid chamber R1 and the pressure chamber Ca to communicate with each other, and supplies the ink from the first common liquid chamber R1 to the pressure chamber Ca. Here, one end of the individual supply flow path Ra1 is opened to the face of the flow path substrate 51*b* facing the Z1 direction. On the other hand, the other end of the individual supply flow path Ra1 is an upstream end of the individual flow path IP and opens to the wall face of the first common liquid chamber R1 of the flow path substrate 51*b*. The individual discharge flow path Ra2 allows the second common liquid chamber R2 and the pressure chamber Cb to communicate with each other, and discharges the ink from the pressure chamber Cb to the second common liquid chamber R2. Here, one end of the individual discharge flow path Ra2 is opened to the face of the flow path substrate 51*b* facing the Z1 direction. On the other hand, the other end of the individual discharge flow path Ra2 is the downstream end of the individual flow path IP, and opens to the wall face of the second common liquid chamber R2 of the flow path substrate 51*b*.

The pressure chamber substrate 51*c* has the pressure chamber Ca and the pressure chamber Cb of each of the plurality of individual flow paths IP. Each of the pressure chamber Ca and the pressure chamber Cb penetrates the pressure chamber substrate 51*c* and is a gap between the flow path substrate 51*b* and the vibration plate 51*d*.

The vibration plate 51*d* is a plate-shaped member that can elastically vibrate. The vibration plate 51*d* is a laminate including, for example, a first layer made of silicon oxide ($SiO_2$) and a second layer made of zirconium oxide ($ZrO_2$). Here, another layer such as a metal oxide may be interposed between the first layer and the second layer. Part or all of the vibration plate 51*d* may be integrally made of the same material as the pressure chamber substrate 51*c*. For example, the vibration plate 51*d* and the pressure chamber substrate 51*c* can be integrally formed by selectively removing part, in the thickness direction, of the region, corresponding to the pressure chamber C, of the plate-shaped member having a predetermined thickness. Further, the vibration plate 51*d* may be composed of a layer of a single material.

The plurality of drive elements 51*e* corresponding to different pressure chambers C is installed on the face of the vibration plate 51*d* facing the Z1 direction. Each drive element 51*e* is composed of, for example, a laminate of a first electrode and a second electrode facing each other and a piezoelectric body layer disposed between the two electrodes. Each drive element 51*e* fluctuates the pressure of the ink in the pressure chamber C to eject the ink in the pressure chamber C from the nozzle N. The drive element 51*e* vibrates the vibration plate 51*d* due to its own deformation when the drive signal Com is supplied. The pressure chamber C expands and contracts with this vibration, so that the pressure of the ink in the pressure chamber C varies.

The case 51*f* is a case that stores the ink. The case 51*f* has a liquid chamber R1*b* that is part other than the liquid chamber R1*a* of the first common liquid chamber R1 and a liquid chamber R2*b* that is part other than the liquid chamber R2*a* of the second common liquid chamber R2, an introduction port P1 and a discharge port P2. Each of the liquid chamber R1*b* and the liquid chamber R2*b* is a recess provided on the face, of the case 51*f*, facing the Z2 direction. The introduction port P1 is a through hole formed by an inner peripheral face extending from the face, of the case 51*f*, facing the Z1 direction and the wall face of the liquid chamber Rib. The supply flow path 65 of the circulation mechanism 60 described above is coupled to the introduction port P1. The discharge port P2 is a through hole formed by an inner peripheral face extending from the face, of the case 51*f*, facing the Z1 direction and the wall face of the liquid chamber R2*b*. The collection flow path 64 of the circulation mechanism 60 described above is coupled to the discharge port P2.

The protective plate 51*g* is a plate-shaped member installed on the face, of the vibration plate 51*d*, facing the Z1 direction, protects the plurality of drive elements 51*e*, and reinforces the mechanical strength of the vibration plate 51*d*. Here, a space that accommodates the plurality of drive elements 51*e* is formed between the protective plate 51*g* and the vibration plate 51*d*.

The wiring substrate 51*h* is mounted on the face, of the vibration plate 51*d*, facing the Z1 direction, and is a mounting component for electrically coupling the control unit 20 and the head chip 51. For example, the wiring substrate 51*h* such as a flexible printed circuit (FPC) or a flexible flat cable (FFC) is preferably used. The above-mentioned switching circuit 52 is mounted on the wiring substrate 51*h*.

In the head chip 51 having the above configuration, the ink flows in the first common liquid chamber R1, the individual supply flow path Ra1, the pressure chamber Ca, the communication flow path Nf, the pressure chamber Cb, and the individual discharge flow path Ra2, and the second common liquid chamber R2 in this order by the operation of the circulation mechanism 60 described above.

Further, the drive element 51*e* corresponding to both the pressure chamber Ca and the pressure chamber Cb is simultaneously driven by the supply signal Vin from the switching circuit 52, thereby fluctuating the pressures in the pressure chamber Ca and the pressure chamber Cb, so that the ink is ejected from the nozzle N due to the pressure fluctuations.

A5: Nozzle

Figure 5:
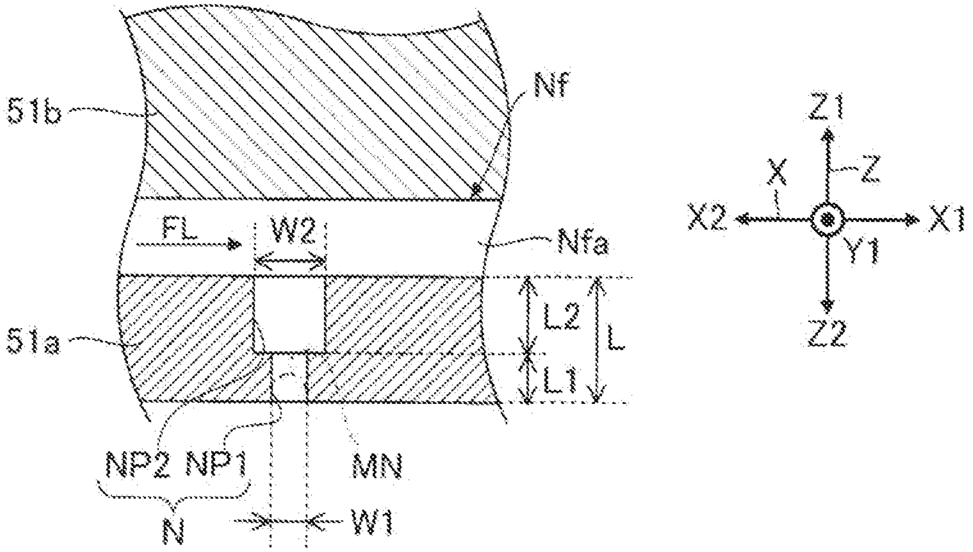
FIG. 5 is an enlarged cross-sectional view of a nozzle.

FIG. 5 is an enlarged cross-sectional view of the nozzle N. FIG. 5 shows a cross section view, orthogonal to the Y axis, of part of the nozzle flow path Nfa and the nozzle N. As shown in FIG. 5, the nozzle N branches off from the nozzle flow path Nfa and extends in a direction different from a direction of the nozzle flow path Nfa. Here, the nozzle flow path Nfa extends in the direction along the X axis, while the nozzle N extends in the direction along the Z axis.

In the example shown in FIG. 5, the nozzle N has a first portion NP1 and a second portion NP2. The first portion NP1 and the second portion NP2 are disposed in the Z1 direction in the order. That is, the second portion NP2 is provided between the nozzle flow path Nfa and the first portion NP1. The nozzle flow path Nfa and the first portion NP1 communicate with each other via the second portion NP2.

The first portion NP1 is open to the face, of the nozzle substrate 51*a*, facing the Z2 direction and extends along the Z axis. The second portion NP2 is open to the face, of the nozzle substrate 51*a*, facing the Z1 direction, and extends in the direction along the Z axis. The first portion NP1 and the second portion NP2 are provided coaxially. However, a width W1 of the first portion NP1 is smaller than a width W2 of the second portion NP2. In other words, the width W2 of the second portion NP2 is larger than the width W1 of the first portion NP1. In this way, the nozzle N has a shape in which the width gradually decreases in the Z2 direction. The width W1 is the length of the first portion NP1 in the direction orthogonal to the Z axis. The width W2 is the length of the second portion NP2 in the direction orthogonal to the Z axis.

The specific width W1 of the first portion NP1 is not particularly limited, but is appropriately determined, for example, according to the characteristics such as the ejection amount or the ejection speed of the ink required for the nozzle N. Further, a length L1 of the first portion NP1 in the direction along the Z axis is not particularly limited, but is appropriately determined according to the characteristics such as the ejection amount or the ejection speed of the ink required for the nozzle N.

The width W2 of the second portion NP2 is only required to be larger than the width W1 of the first portion NP1, and is preferably smaller than the width of the nozzle flow path Nfa in the direction along the Y axis. In this case, it is possible to reduce the occurrence of crosstalk between two second portions NP2 adjacent to each other in the direction along the Y axis. Further, a length L2 of the second portion NP2 in the direction along the Z axis is appropriately determined according to the width W2 of the second portion NP2, the thickness of the nozzle substrate 51*a*, and the like.

As described above, the nozzle N extends in a direction intersecting the direction in which the nozzle flow path Nfa extends. Therefore, even when the above-mentioned circulation mechanism 60 is operated, it is difficult for the circulating flow of the ink generated in the nozzle flow path Nfa due to the operation to reach the inside of the nozzle N. Specifically, the nozzle N having the first portion NP1 and the second portion NP2 as described above is required to secure the lengths of the first portion NP1 and the second portion NP2 in the Z axis direction to some extent, so that it is difficult for the circulating flow to reach the first portion NP1, compared with a nozzle having a constant width. Therefore, the ink tends to stay in the nozzle N in the period during which the drive element 51*e* is not operated. Therefore, if the period elapses long, the ink in the nozzle N may be thickened.

Therefore, in the liquid ejection apparatus 100, the drive element 51*e* is driven so as to vibrate a meniscus MN for a predetermined period to the extent that the ink is not ejected from the nozzle N even during the period during which the ink is not ejected from the nozzle N. Since the ink in the nozzle N is agitated by such vibration of the meniscus MN, the ink is smoothly displaced between the nozzle N and the nozzle flow path Nfa together with the action of the circulation flow of the ink by the circulation mechanism 60. Therefore, thickening of the ink in the nozzle N is prevented.

Here, even during the period during which the ink is not ejected from the nozzle N, the drive element 51*e* for vibrating the meniscus MN described above is not driven for the nozzle N for a predetermined period immediately after the ink is ejected. In the nozzle N for a predetermined period immediately after the ink is ejected, the meniscus MN of the ink vibrates due to the residual vibration, so that the ink is agitated. Therefore, even when the drive element 51*e* is not separately driven to vibrate the meniscus MN, thickening of the ink in the nozzle N is prevented. This point will be described later with reference to FIGS. 9 and 10.

As described above, by not driving the drive element 51*e* to vibrate the meniscus MN described above for the nozzle N for a predetermined period immediately after the ink is ejected, it is possible to reduce heat generation due to driving the drive element 51*e* more than necessary.

When the drive element 51*e* is driven to vibrate the meniscus MN described above for the nozzle N for a predetermined period immediately after the ink is ejected, the meniscus MN vibrates excessively. As a result, the meniscus MN is affected by a circulating flow of the ink in the nozzle flow path Nfa and vibrates in the direction of the circulating flow. When the drive element 51*e* is driven in this state to eject the ink from the nozzle N, the ink ejection from the nozzle N is may unstable, resulting in deterioration of image quality. On the other hand, by not driving the drive element 51*e* to vibrate the meniscus MN described above for the nozzle N for a predetermined period immediately after the ink is ejected, it is possible to reduce deterioration of the image quality due to the excessive vibration of the meniscus MN. Hereinafter, the driving of the drive element 51*e* will be described in detail.

A6: Driving of Drive Element 51*e*

Figure 6:
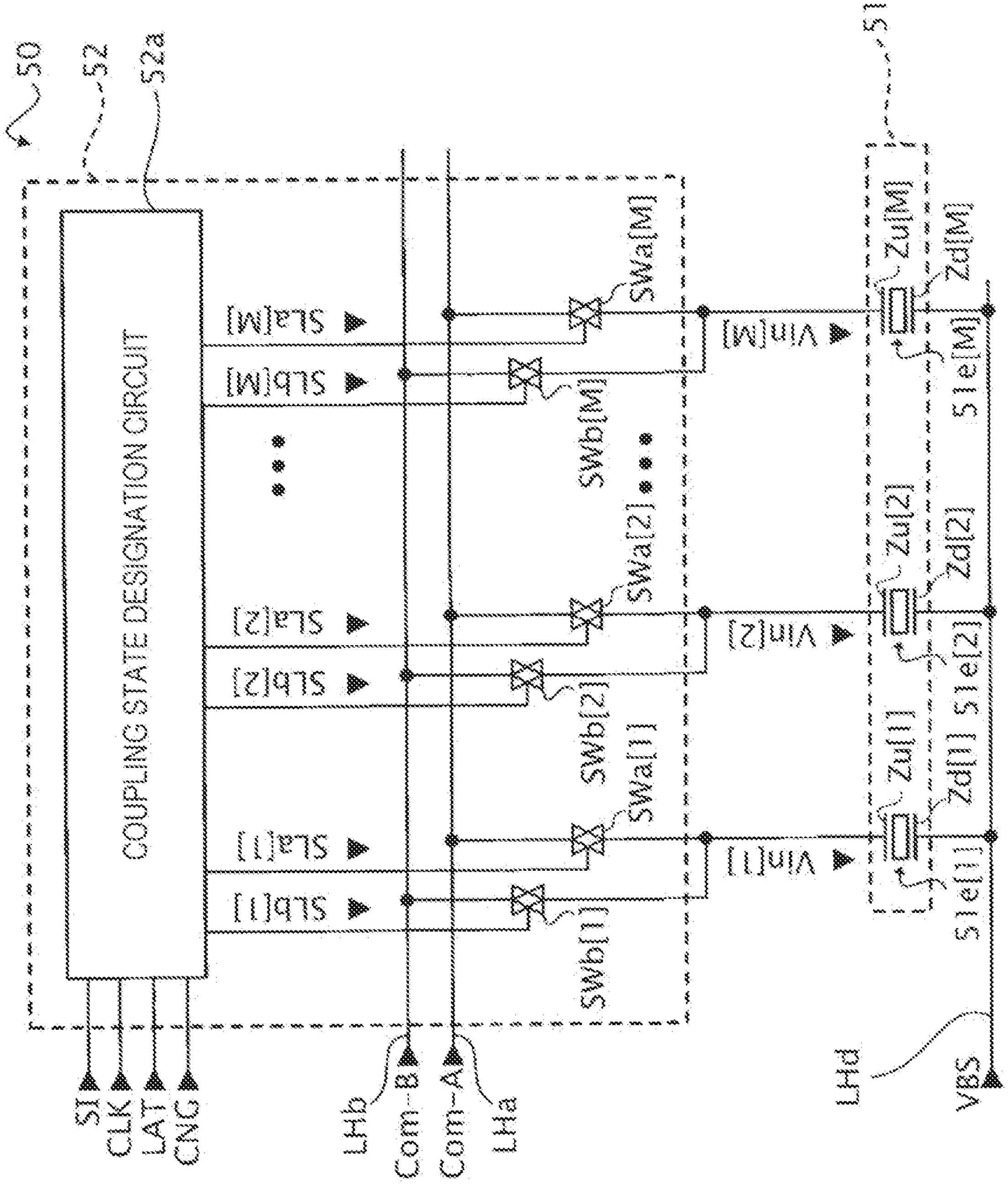
FIG. 6 is a diagram for explaining a switching circuit.

FIG. 6 is a diagram for explaining the switching circuit 52. The drive element 51*e* is driven by the supply signal Vin from the switching circuit 52. Hereinafter, the switching circuit 52 will be described with reference to FIG. 6. In the example shown in FIG. 6, the drive signal Com includes a drive signal Com-A and a drive signal Com-B.

As shown in FIG. 6, wiring LHa and wiring LHb are coupled to the switching circuit 52. The wiring LHa is a signal line for transmitting the drive signal Com-A. The wiring LHb is a signal line for transmitting the drive signal Com-B. In FIG. 6, one of the first electrode and the second electrode of the above-mentioned drive element 51*e* is indicated as an electrode Zd[m], and the other is indicated as an electrode Zu[m]. Wiring LHd is coupled to the electrode Zd[m]. The wiring LHd is a power supply line to which the offset potential VBS is supplied.

The switching circuit 52 includes M switches SWa (SWa[1] to SWa[M]), M switches SWb (SWb[1] to SWb[M]), and a coupling state designation circuit 52*a* that designates the coupling state of these switches.

The switch SWa[m] is a switch that switches between conduction (on) and non-conduction (off) between the wiring LHa for transmitting the drive signal Com-A and the electrode Zu[m] of the drive element 51*e*[m]. The switch SWb[m] is a switch that switches between conduction (on) and non-conduction (off) between the wiring LHb for transmitting the drive signal Com-B and the electrode Zu[m] of the drive element 51*e*[m]. Each of these switches is, for example, a transmission gate.

The coupling state designation circuit 52*a* generates, based on the clock signal CLK, the print data signal SI, the latch signal LAT, and the change signal CNG supplied from the control circuit 21, coupling state designation signals SLa[1] to SLa[M] for designating on/off of the switches SWa[1] to SWa[M] and coupling state designation signals SLb[1] to SLb[M] for designating the on/off of the switches SWb[1] to SWb[M].

For example, although not shown, the coupling state designation circuit 52*a* has a plurality of transfer circuits, a plurality of latch circuits, and a plurality of decoders so as to have a one-to-one correspondence with the drive elements 51*e*[1] to 51*e*[M]. Of these, the print data signal SI is supplied to the transfer circuits. Here, the print data signal SI includes an individual designation signal for each drive element 51*e*, and the individual designation signals are supplied serially. For example, the individual designation signals are synchronized with the clock signal CLK and are transferred in order to a plurality of transfer circuits. Further, the latch circuit latches the individual designation signal supplied to the transfer circuit based on the latch signal LAT. Further, the decoder generates the coupling state designation signals SLa[m] and SLb[m] based on the individual designation signal, the latch signal LAT, and the change signal CNG.

The switch SWa[m] is switched on and off according to the coupling state designation signal SLa[m] generated as described above. For example, the switch SWa[m] is turned on when the coupling state designation signal SLa[m] is at high level, and turned off when the coupling state designation signal SLa[m] is at low level. As described above, the switching circuit 52 supplies part or all of the waveform included in the drive signal Com-A as the supply signal Vin to one or more drive elements 51*e* selected from the plurality of drive elements 51*e*.

Similarly, the switch SWb[m] is switched on and off according to the coupling state designation signal SLb[m]. For example, the switch SWb[m] is turned on when the coupling state designation signal SLb[m] is at high level, and turned off when the coupling state designation signal SLb[m] is at low level. As described above, the switching circuit 52 supplies part or all of the waveform included in the drive signal Com-B as the supply signal Vin to one or more drive elements 51*e* selected from the plurality of drive elements 51*e*.

A7: Drive Signal

Figure 7:
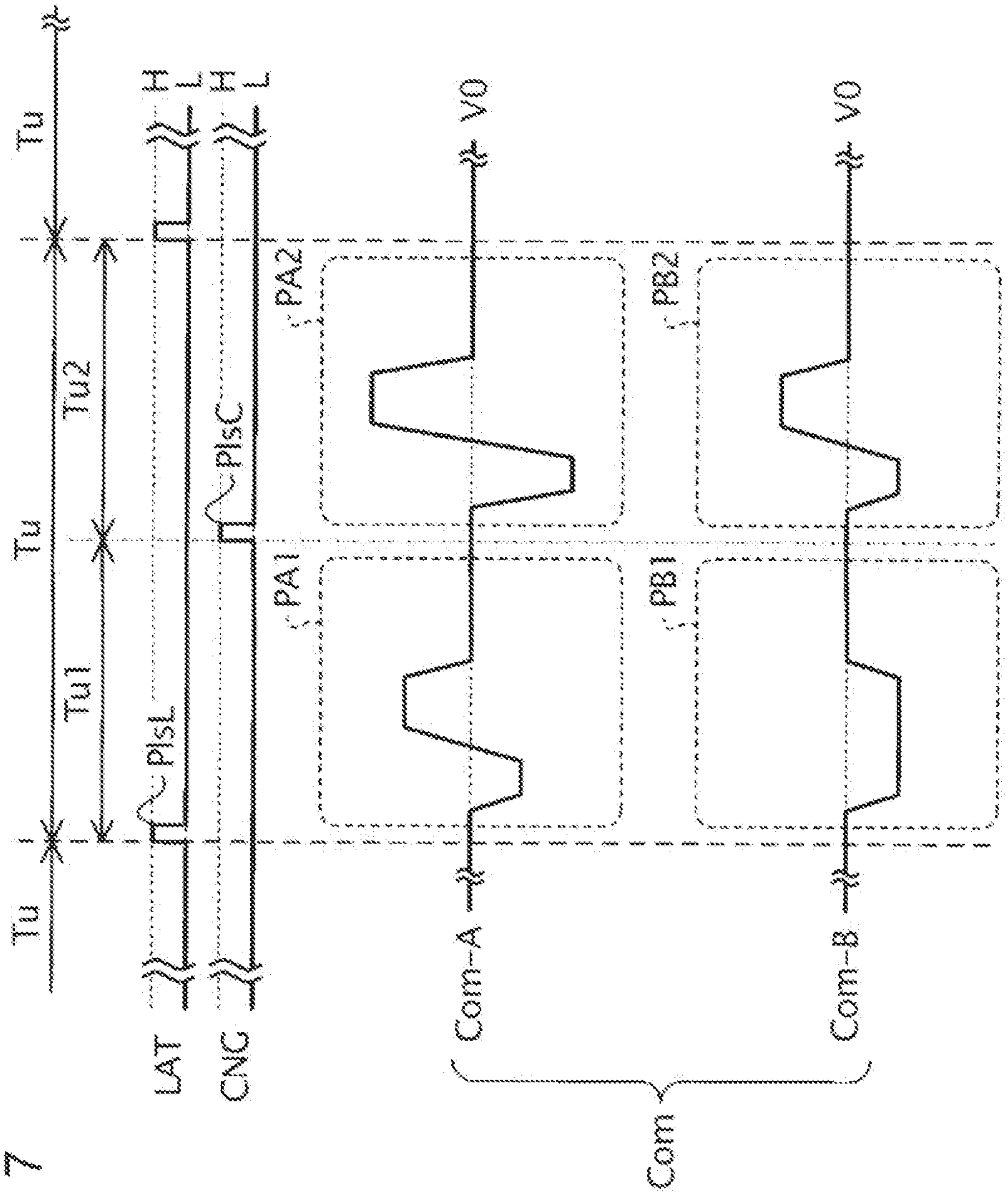
FIG. 7 is a diagram for explaining a drive signal.

FIG. 7 is a diagram for explaining the drive signal Com. As shown in FIG. 7, the latch signal LAT includes a pulse PlsL for defining a unit period Tu. The unit period Tu corresponds to a printing cycle in which a dot is formed on the medium M by the ink from the nozzle N. The unit period Tu is defined, for example, as a period from the rise of the pulse PlsL to the rise of the next pulse PlsL. Further, the change signal CNG includes a pulse PlsC for dividing the unit period Tu into a preceding control period Tu1 and a succeeding control period Tu2. The control period Tu1 is, for example, a period from the rise of the pulse PlsL to the rise of the pulse PlsC. The control period Tu2 is, for example, a period from the rise of the pulse PlsC to the rise of the pulse PlsL.

The drive signal Com-A has an ejection pulse PA1 provided in the control period Tu1 and an ejection pulse PA2 provided in the control period Tu2. Each of the ejection pulses PA1 and PA2 is a potential pulse that drives the drive element 51*e* so as to cause, in the pressure chamber C, a pressure fluctuation of the strength with which the ink is ejected from the nozzle N. When the ejection pulse PA1 is supplied to the drive element 51*e*, a small amount of ink is ejected from the nozzle N as an ink droplets. When the ejection pulse PA2 is supplied to the drive element 51*e*, a medium amount of ink is ejected from the nozzle N as an ink droplets.

In the example shown in FIG. 7, each of the ejection pulse PA1 and the ejection pulse PA2 is a waveform in which a potential decreases from the reference potential to a potential lower than the reference potential, then rises to a potential higher than the reference potential, and then returns to the reference potential. Further, the potential difference between the highest potential and the lowest potential in the ejection pulse PA1 is smaller than the potential difference between the highest potential and the lowest potential in the ejection pulse PA2. The reference potential is, for example, a potential higher than the offset potential VBS.

The drive signal Com-B has a non-ejection pulse PB1 provided in the control period Tu1 and an ejection pulse PB2 provided in the control period Tu2. The non-ejection pulse PB1 is a potential pulse that drives the drive element 51*e* so as to cause, in the pressure chamber C, a pressure fluctuation of the strength with which the ink is not ejected from the nozzle N. By supplying the non-ejection pulse PB1 to the drive element 51*e*, the meniscus MN of the ink in the nozzle N is slightly vibrated without ejecting the ink from the nozzle N. The ejection pulse PB2 is a potential pulse that drives the drive element 51*e* so as to cause, in the pressure chamber C, a pressure fluctuation of the strength with which the ink is ejected from the nozzle N. By supplying the ejection pulse PB2 to the drive element 51*e*, a small amount of ink is ejected from the nozzle N as an ink droplets.

In the example shown in FIG. 7, the non-ejection pulse PB1 is a waveform in which a potential decreases to a potential lower than the reference potential from the reference potential, and then returns to the reference potential. As in to the above-mentioned ejection pulse PA1 and ejection pulse PA2, the ejection pulse PB2 has a waveform in which a potential decreases from the reference potential to a potential lower than the reference potential, then rises to a potential higher than the reference potential, and then returns to the reference potential. Further, the lowest potential of the ejection pulse PB2 is lower than the lowest potential of the non-ejection pulse PB1. Further, the potential difference between the highest potential and the lowest potential in the ejection pulse PA2 is equal to the potential difference between the highest potential and the lowest potential in the ejection pulse PA1.

The potential difference between the highest potential and the lowest potential in the ejection pulse PA2 may be different from the potential difference between the highest potential and the lowest potential in the ejection pulse PA1. The lowest potential of the ejection pulse PB2 may be equal to or higher than the lowest potential of the non-ejection pulse PB1.

The above ejection pulses PA1, PA2, PB1 and PB2 are appropriately selected and used for the supply signal Vin. As a result, the amount of ink ejected from the nozzle N can be adjusted, and the ink in the nozzle N can be slightly vibrated without ejecting the ink from the nozzle N.

A8: Ejection Period and Non-Ejection Period

Figure 8:
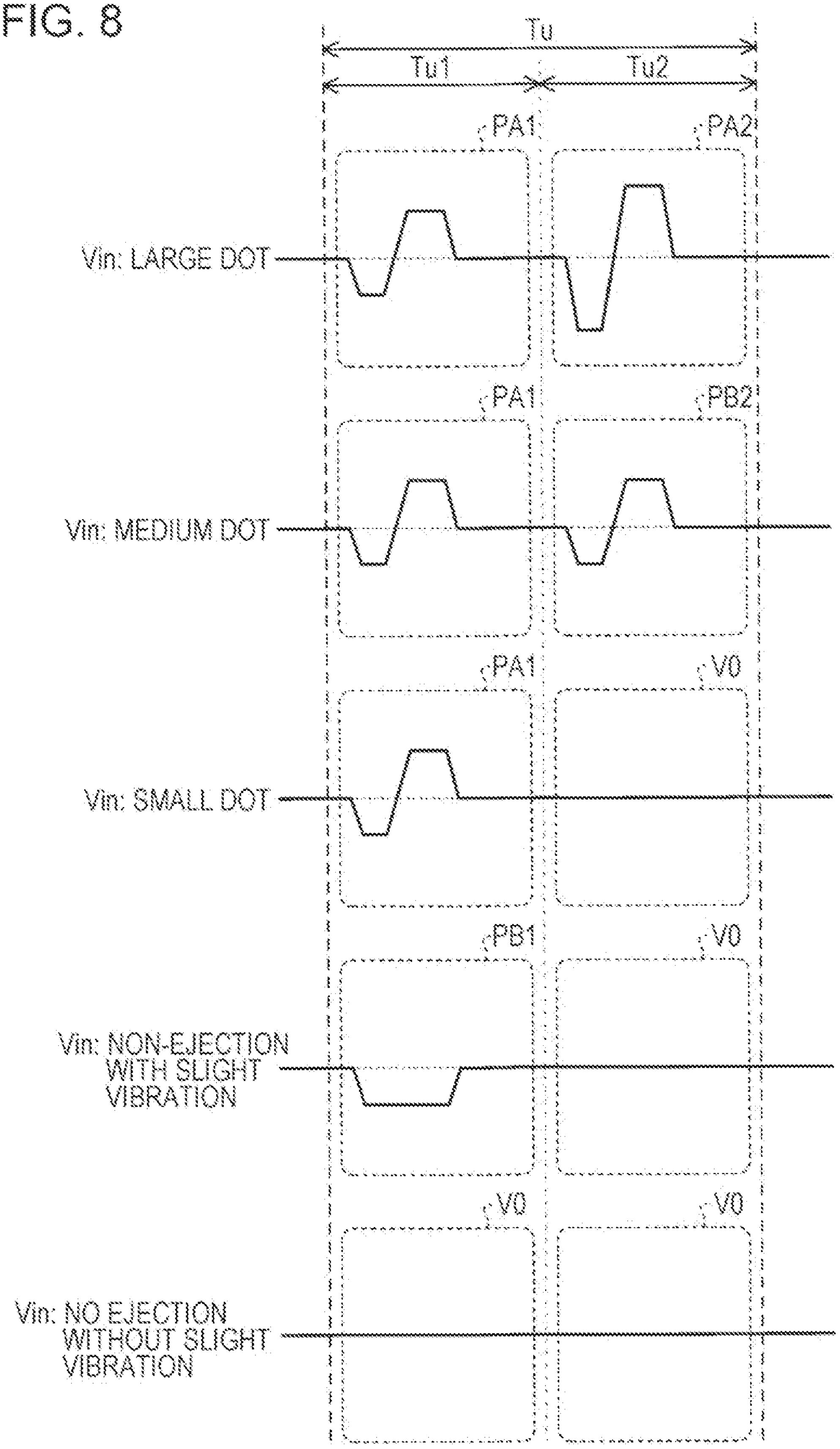
FIG. 8 is a diagram for explaining an output signal from the switching circuit.

FIG. 8 is a diagram for explaining the supply signal Vin from the switching circuit 52. FIG. 8 illustrates the waveforms of the respective supply signals Vin in a case in which a small dot, a medium dot, or a large dot is formed on the medium M, in a case in which the ink in the nozzle N is slightly vibrated without ejecting the ink from the nozzle N, and in a case in which the ink is not ejected from the nozzle N without slightly vibrating the ink in the nozzle N.

In a case in which a large dot is formed on the medium M, the supply signal Vin in the unit period Tu is a waveform including the ejection pulse PA1 in the control period Tu1 and the ejection pulse PA2 in the control period Tu2. By supplying such a supply signal Vin to the drive element 51*e*, a small amount of an ink droplet and a medium amount of an ink droplet are continuously ejected from the nozzle N in this order. As a result, a large dot is formed on the medium M by landing on the medium M in a state where these ink droplets are united.

In a case in which a medium dot is formed on the medium M, the supply signal Vin in the unit period Tu is a waveform including the ejection pulse PA1 in the control period Tu1 and the ejection pulse PB2 in the control period Tu2. By supplying such a supply signal Vin to the drive element 51*e*, a small amount of an ink droplet is continuously ejected twice from the nozzle N. As a result, a medium dot is formed on the medium M by landing on the medium M in a state where these ink droplets are united.

In a case in which a small dot is formed on the medium M, the supply signal Vin in the unit period Tu is a waveform including the ejection pulse PA1 in the control period Tu1 and having the reference potential in the control period Tu2. By supplying such a supply signal Vin to the drive element 51*e*, a small amount of an ink droplet is ejected once from the nozzle N. As a result, a small dot is formed on the medium M by landing the ink droplet on the medium M.

In a case in which the meniscus MN of the ink in the nozzle N is slightly vibrated without ejecting the ink from the nozzle N, the supply signal Vin in the unit period Tu is a waveform including the non-ejection pulse PB1 in the control period Tu1 and having the reference potential in the control period Tu2. By supplying such a supply signal Vin to the drive element 51*e*, the ink in the nozzle is slightly vibrated without ejecting any ink droplet from the nozzle N. In this case, no dot is formed on the medium M.

In a case in which the ink is not ejected from the nozzle N without slightly vibrating the meniscus MN of the ink in the nozzle N, the supply signal Vin in the unit period Tu is a waveform having the reference potential in the control period Tu1 and the control period Tu2. By supplying such a supply signal Vin to the drive element 51*e*, the ink in the nozzle N is not slightly vibrated and no ink is ejected from the nozzle N. Also in this case, no dot is formed on the medium M.

As described above, the ejection pulses PA1, PA2, and PB2 are appropriately applied during the ejection period during which the ink is ejected from the nozzle N. Further, during the non-ejection period during which no ink is ejected from the nozzle N, the non-ejection pulse PB1 is applied without applying the ejection pulses PA1, PA2, and PB2, or neither the ejection pulse PA1, PA2, PB2 nor the non-ejection pulse PB1 is applied. During the ejection period, any one of the ejection pulses PA1, PA2, and PB2 in combination with the non-ejection pulse PB1 may be applied.

Figure 9:
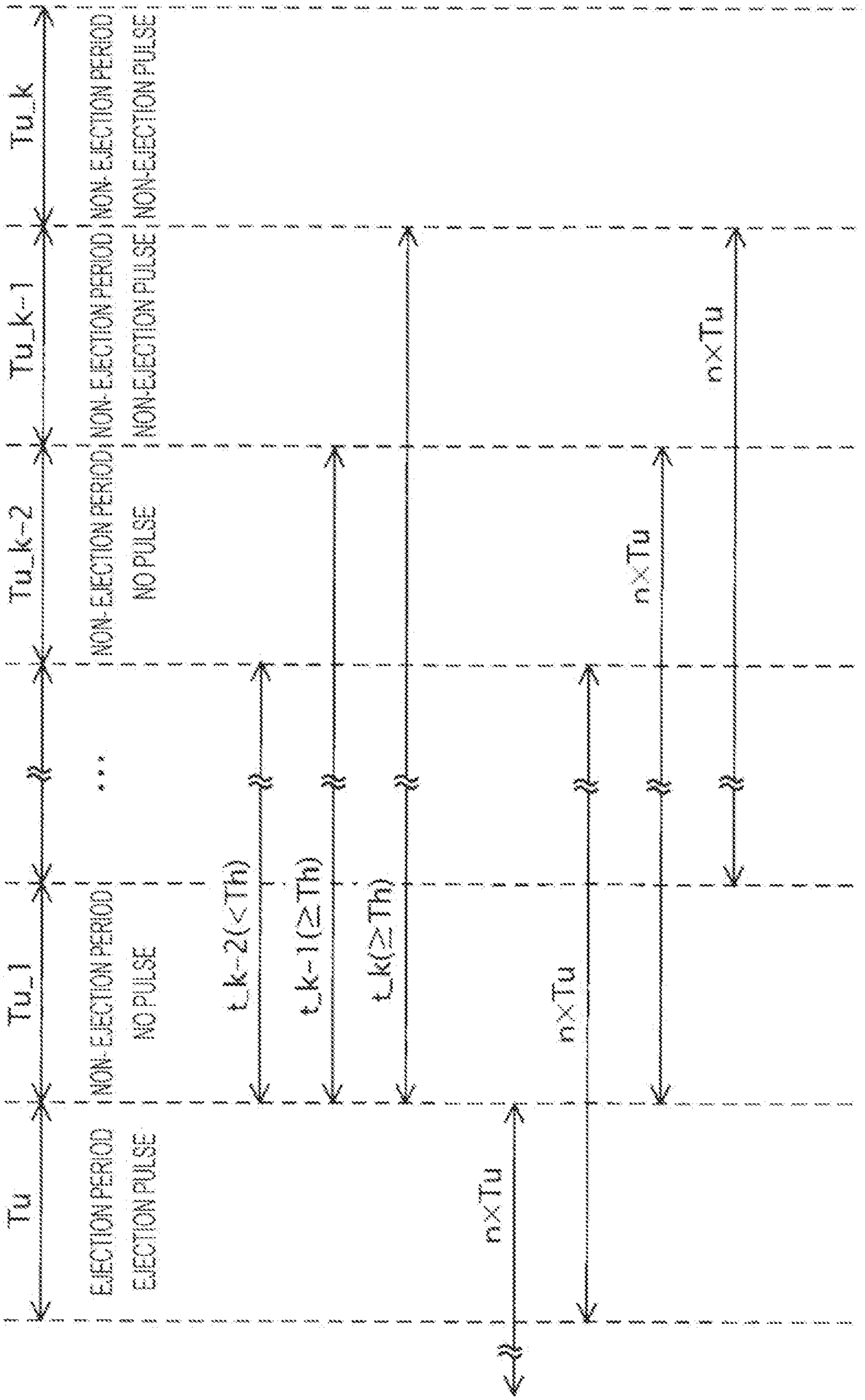
FIG. 9 is a diagram for explaining a period of use of a non-ejection pulse.

FIG. 9 is a diagram for explaining a period of use of the non-ejection pulse PB1. FIG. 9 illustrates that based on the print data Img, in the nozzle N[m], the non-ejection period that is the unit period Tu during which no ink is ejected repeatedly lasts k times consecutively after the ejection period that is the unit period Tu during which the ink is ejected. The unit period Tu corresponding to the non-ejection period lasting k times is shown as the unit period Tu_1 to Tu_k. Further, the respective elapsed time lengths t_k−2 to t_k from the ejection period to each of the unit periods Tu_k−2 to Tu_k, respectively, are shown. In the example shown in FIG. 9, k is an integer of 4 or more. In the following, the elapsed time lengths t_k−2 to t_k may be expressed as the elapsed time t without distinction.

Figure 10:
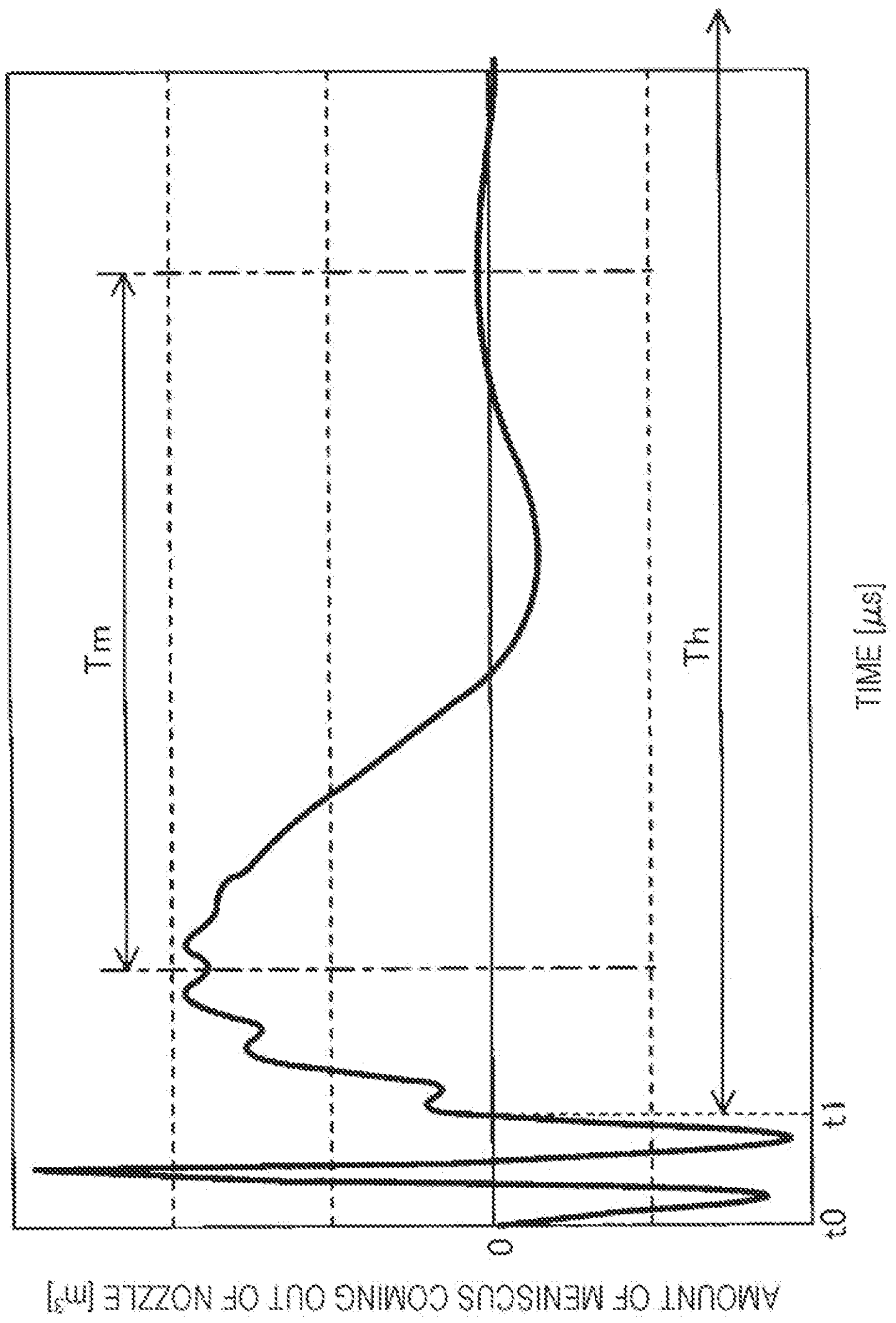
FIG. 10 is a graph showing a change over time in the amount of a meniscus of a liquid emitted from a nozzle after supply of an ejection pulse to a drive element.

The unit period Tu that is a target for determining which supply signal Vin is to be supplied to the drive element 51*e*[m] is regarded as the target period. In a case in which the target period is the non-ejection period and an elapsed time length t from the last ejection period before the target period is less than a predetermined time length Th, none of the ejection pulses PA1, PA2, and PB2, and the non-ejection pulse PB1 is sent to the drive element 51*e*[m]. Here, the predetermined time length Th, which will be described later with reference to FIG. 10, is a time length that is q times or more ½ of a natural vibration cycle Tm of the meniscus MN of the ink in the nozzle N where q is an integer of one or more.

In the example shown in FIG. 9, in a case in which the unit period Tu_k−2 is the target period, the elapsed time length t_k−2 from the last ejection period before the unit period Tu_k−2 is less than the predetermined time length Th. Therefore, none of the ejection pulses PA1, PA2, and PB2 and the non-ejection pulse PB1 is supplied to the drive element 51*e* during the unit period Tu_k−2.

On the other hand, in a case in which the target period is the non-ejection period and the elapsed time length t is equal to or longer than the predetermined time length Th, none of the ejection pulses PA1, PA2, and PB2 is supplied but the non-ejection pulse PB1 is supplied to the drive element 51*e*.

In the example shown in FIG. 9, in a case in which the unit period Tu_k−1 is the target period, the elapsed time length t_k−1 from the last ejection period before the unit period Tu_k−1 is equal to or longer than the predetermined time length Th. Therefore, during the unit period Tu_k−1, none of the ejection pulses PA1, PA2, and PB2 is supplied to the drive element 51*e*, but the non-ejection pulse PB1 is supplied.

In a case in which the unit period Tu_k is the target period, the elapsed time length t_k from the last ejection period before the unit period Tu_k is equal to or longer than the predetermined time length Th. Therefore, none of the ejection pulses PA1, PA2, and PB2 is supplied to the drive element 51*e*, but the non-ejection pulse PB1 is supplied.

The determination as to whether the elapsed time length t as described above is equal to or longer than the predetermined time length Th can be carried out, for example, by setting a period that is n times the cycle of the unit period Tu as a determination period corresponding to the predetermined time length Th where n is an integer of one or more and determining whether there is an ejection period within the determination period. That is, in a case in which there is an ejection period within the determination period, it is determined that the elapsed time length t is less than the predetermined time length Th. On the other hand, in a case in which there is no ejection period within the determination period, it is determined that the elapsed time length t is equal to or longer than the predetermined time length Th. The length of the determination period is about the same as the predetermined time length t.

After determining that the elapsed time length t is equal to or longer than the predetermined time length Th, the elapsed time length t is equal to or longer than the predetermined time length Th until the target period that is the target unit period Tu is the ejection period. Therefore, in a case in which the target period is the non-ejection period, the unit period Tu immediately before the target period is the non-ejection period, and the non-ejection pulse PB1 is supplied to the drive element 51*e* during the unit period Tu immediately before the target period, it may be determined that the elapsed time length t is equal to or longer than the predetermined time length Th. In other words, in a case in which the unit period Tu immediately after the unit period Tu during which the non-ejection pulse PB1 is supplied to the drive element 51*e*[m] is the target period and the ink is not ejected from the nozzle N[m] during the target period, it is determined that the target period is a non-ejection period, and the elapsed time length t is equal to or longer than the predetermined time length Th, so that the non-ejection pulse PB1 is supplied to the drive element 51*e*.

FIG. 10 is a graph showing a change with time in the amount of meniscus MN of the ink ejected from the nozzle N when the ejection pulse PA1, the ejection pulse PA2, or the ejection pulse PB2 is supplied to the drive element 51*e*. The amount is the volume of the space surrounded by the virtual plane including the outer edge of the distal end of the nozzle N over the entire circumference and the meniscus MN. In a case in which the meniscus MN is out of the nozzle N, the amount represents a positive value, and in a case in which the meniscus MN is in the nozzle N, the amount represents a negative value. Instead of the amount, the position of the meniscus MN with the distal end of the nozzle N as a reference is used to obtain a similar change with time as in FIG. 10.

In the example shown in FIG. 10, the ink is ejected from the nozzle N during a period from timing T0 to timing T1, and the meniscus MN vibrates with the natural vibration cycle Tm for a predetermined period even after the period has elapsed. This is referred to as the residual vibration of the Meniscus MN. Therefore, when the non-ejection pulse PB1 is applied for the predetermined period, the residual vibration of the meniscus MN and the change in pressure to the ink due to the non-ejection pulse PB1 are combined, and the meniscus MN may vibrate excessively. Therefore, the non-ejection pulse PB1 is applied so as to avoid the predetermined period.

The length of the predetermined period corresponds to the above-mentioned predetermined time length Th. Therefore, the above-mentioned predetermined time length Th is a time length that is q times or more ½ of the natural vibration cycle of the meniscus MN of the ink in the nozzle N where q is an integer of one or more.

q is preferably one or more and ten or less, more preferably one or more and eight or less, and further preferably four or more and eight or less. In a case where q is too small, the effect of reducing the unintentional vibration of the meniscus MN described above tends to decrease depending on the waveforms of the ejection pulses PA1, PA2, and PB2 and the like. On the other hand, in a case where q is too large, depending on the content of the print data Img and the like, the period during which neither the ejection pulse nor the non-ejection pulse is supplied to the drive element 51*e* is too long, so that there is a possibility of thickening of the ink.

Here, from the viewpoint of achieving both high printing speed and high image quality, the cycle (predetermined cycle) of the unit period Tu is preferably 8 μsec or more and 100 μsec or less. On the other hand, the natural vibration cycle Tm of the meniscus MN of the ink in the nozzle N is generally equal to or longer than the cycle (predetermined cycle) of the unit period Tu, and is, for example, 40 μsec or more and 120 μsec or less. Therefore, the predetermined time length Th is preferably q times or more the time length corresponding to ½, that is 20 μsec or more and 60 μsec or less, of the natural vibration cycle Tm of the meniscus MN.

Figure 11:
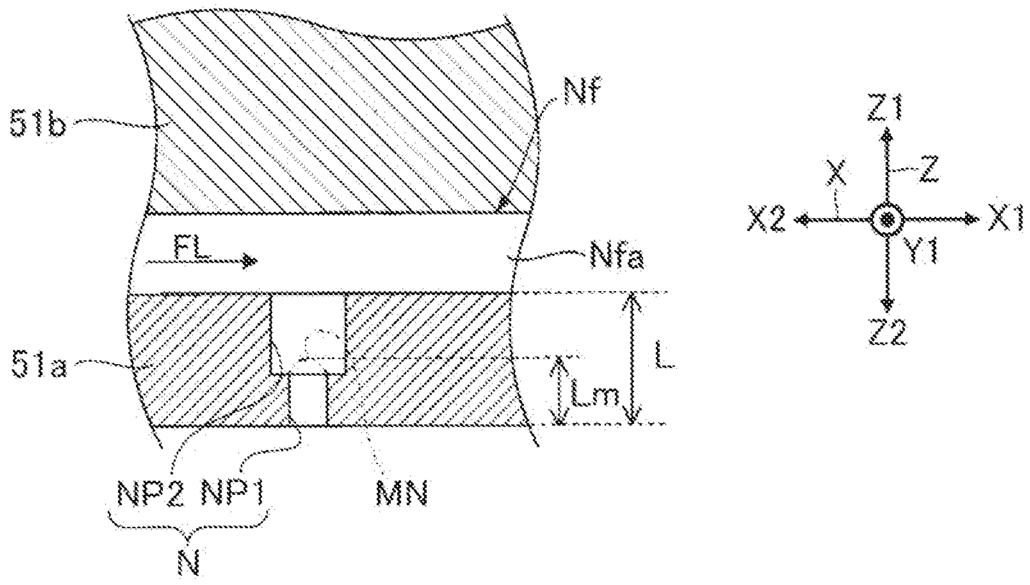
FIG. 11 is a diagram for explaining vibration of a meniscus of a liquid in a nozzle due to supply of a non-ejection pulse to a drive element.

FIG. 11 is a diagram for explaining the vibration of the meniscus MN of the ink in the nozzle N due to the supply of the non-ejection pulse PB1 to the drive element 51*e*. When the non-ejection pulse PB1 is supplied to the drive element 51*e*, the meniscus MN vibrates in the direction along the Z axis, that is, in the direction in which the nozzle N extends. Therefore, the ink in the nozzle N is agitated. As a result, the ink is smoothly displaced between the nozzle N and the nozzle flow path Nfa, coupled with the action of the ink flow (circulation flow) in the direction FL in the nozzle flow path Nfa by the circulation mechanism 60.

Here, the vibration of the meniscus MN due to the supply of the non-ejection pulse PB1 to the drive element 51*e* has a magnitude with which the ink is not ejected from the nozzle N. That is, the non-ejection pulse PB1 causes, in the pressure chamber C, a pressure fluctuation of the strength with which the ink is not ejected from the nozzle N by driving the drive element 51*e*.

Here, it is preferable that the position of the meniscus MN most drawn into the nozzle N by supplying the non-ejection pulse PB1 to the drive element 51*e* is as close to the nozzle flow path Nfa as possible within the range where the ink is not ejected from the nozzle N.

More specifically, $Lm/L>0.3$ is preferable, $0.3<Lm/L<1$ is more preferably, and $0.3<Lm/L<0.5$ is still more preferable where L is the length of the nozzle N, and Lm is a distance between the position of the meniscus MN, of the ink, most drawn into the nozzle N by supplying the non-ejection pulse PB1 to the drive element 51*e* and the distal end of the nozzle N. In this case, the ink is preferably displaced between the nozzle N and the nozzle flow path Nfa as described above. On the other hand, when Lm/L is too small, the ink displacement between the nozzle N and the nozzle flow path Nfa may be insufficient depending on the length and width of the first portion NP1 of the nozzle N. On the other hand, when Lm/L is too large, air bubbles may be caught in the nozzle N.

Further, in the configuration in which the nozzle N has the first portion NP1 and the second portion NP2 as in the present embodiment, it is preferable that the position of the meniscus MN most drawn into the nozzle N by supplying the non-ejection pulse PB1 to the drive element 51*e* reaches the second portion NP2 of the nozzle N. In this case, the ink is preferably displaced between the nozzle N and the nozzle flow path Nfa as described above.

When the non-ejection pulse PB1 set in this way is supplied to the drive element 51*e* at timing less than the predetermined time length Th after the ejection pulse PA1, the ejection pulse PA2 or the ejection pulse PB2 is supplied to the drive element 51*e*, the residual vibration of the meniscus MN and the pressure fluctuation of the ink due to the ejection pulse PB2 are combined as described above, and the meniscus MN is greatly drawn. As a result, the meniscus MN is affected by the circulating flow and vibrates in the direction of the circulating flow. When the ejection pulse PA1, the ejection pulse PA2 or the ejection pulse PB2 is supplied to the drive element 51*e* in such a state where the vibration of the meniscus MN is unstable, the ink ejection from the nozzle N may be unstable, resulting in deterioration of image quality.

As described above, the above liquid ejection apparatus 100 includes the pressure chamber C, the individual supply flow path Ra1, which is an example of a “first flow path”, the communication flow path Nf, which is an example of a “second flow path”, the nozzle N, the drive element 51*e*, the drive signal generation circuit 24, which is an example of a “drive signal generation unit”, and the control circuit 21, which is an example of a “controller”.

As described above, the individual supply flow path Ra1 supplies the ink, which is an example of a “liquid”, to the pressure chamber C. The communication flow path Nf allows the ink to discharge from the pressure chamber C. The nozzle N branches off from the communication flow path Nf and ejects the ink. The drive element 51*e* gives a pressure fluctuation to the ink in the pressure chamber C according to the drive signal Com. The drive signal generation circuit 24 generates the drive signal Com. Based on the print data Img, the control circuit 21 controls the supply of the drive signal Com to the drive element 51*e* so that the target period is either an ejection period during which the ink is ejected from the nozzle N or a non-ejection period during which the ink is not ejected from the nozzle N per unit period Tu of a predetermined cycle.

As described above, the drive signal Com includes the ejection pulses PA1, PA2, and PB2 and the non-ejection pulse PB1. Each of the ejection pulses PA1, PA2, and PB2 drives the drive element 51*e* so as to cause, in the pressure chamber C, a pressure fluctuation of the strength with which the ink is ejected from the nozzle N. The non-ejection pulse PB1 drives the drive element 51*e* so as to cause, in the pressure chamber C, a pressure fluctuation with a strength with which the ink is not ejected from the nozzle N.

As described above, the control circuit 21 supplies the ejection pulses PA1, PA2, and PB2 to the drive element 51*e* in a case in which the target period is the ejection period. In a case in which the target period is the non-ejection period and the elapsed time length t from the last ejection period before the target period is less than the predetermined time length Th, the control circuit 21 supplies none of the ejection pulses PA1, PA2, and PB2 and the non-ejection pulse PB1 to the drive elements 51*e*. In a case in which the target period is the non-ejection period and the elapsed time length t is equal to or longer than the predetermined time length Th, the control circuit 21 supplies none of the ejection pulses PA1, PA2, and PB2 but supplies the non-ejection pulse PB1 to the drive element 51*e*. Here, the predetermined time length Th is a time length that is q times or more ½ of the natural vibration cycle Tm of the meniscus MN of the ink in the nozzle N where q is an integer of one or more.

In the above liquid ejection apparatus 100, in a case in which the target period is the non-ejection period and the elapsed time length t from the last ejection period before the target period is equal to or longer than the predetermined time length Th, the non-ejection pulse PB1 is supplied to the drive element 51*e*, so that the meniscus MN of the liquid in the nozzle N can be vibrated. Therefore, even when the nozzle N branches off from the communication flow path Nf, the ink in the nozzle N is agitated by the vibration, so that the ink retention in the nozzle N during the non-ejection period can be reduced. As a result, it is possible to reduce an ejection failure due to thickening of the ink in the nozzle N.

Moreover, since the predetermined time length t is an integral multiple or more of ½ of the natural vibration cycle Tm of the ink meniscus MN in the nozzle N, it is possible to reduce the unintentional vibration of the meniscus MN of the ink in the nozzle N. Therefore, it is possible to reduce the ejection failure due to the vibration.

Further, in a case in which the target period is the non-ejection period and the elapsed time length t from the last ejection period before the target period is less than the predetermined time length Th, the non-ejection pulse PB1 is not supplied to the drive element 51*e*. Therefore, since the ink is not given the pressure fluctuation in due to the non-ejection pulse PB1 during a period during which the residual vibration of the meniscus MN that vibrates after the ink is ejected from the nozzle N does not subside, the vibration of the meniscus MN is not made unstable. In a case in which the ink is ejected from the nozzle N after that, stable ejection is possible. Further, since the vibration generated in the meniscus MN during the ejection period remains for the target period, the meniscus MN of the ink in the nozzle N can be vibrated even when the non-ejection pulse PB1 is not supplied to the drive element 51*e*. Therefore, it is possible to suitably reduce the retention of the ink in the nozzle N during the non-ejection period. Therefore, it is possible to prevent the supply of the non-ejection pulse PB1 to the drive element 51*e* more than necessary, and to reduce problems such as heat generation of the drive element 51*e*.

As described above, for example, in a case in which the target period is the non-ejection period and the ejection period is present within the determination period, the control circuit 21 determines that the elapsed time length t is less than the predetermined time length Th. In this case, the non-ejection pulse PB1 is not supplied to the drive element 51*e*. On the other hand, in a case in which the target period is the non-ejection period and the ejection period is not present within the determination period, the control circuit 21 determines that the elapsed time length t is equal to or longer than the predetermined time length Th. In this case, the non-ejection pulse PB1 is supplied to the drive element 51*e*. Here, the determination period is a period that is n times a predetermined cycle (cycle of the unit period Tu) before the target period where n is an integer of one or more.

As described above, in a case in which the target period is the non-ejection period, the unit period Tu immediately before the target period is the non-ejection period, and the non-ejection pulse PB1 is supplied to the drive element 51*e* during the unit period Tu immediately before the target period, the control circuit 21 determines that the elapsed time length t is equal to or longer than the predetermined time length Th. In this case, the non-ejection pulse PB1 is supplied to the drive element 51*e*.

Further, as described above, in a case in which the cycle (predetermined cycle) of the unit period Tu is 8 μsec or more and 100 μsec or less, it is possible to increase the printing speed. Further, under such a cycle of the unit period Tu, the vibration generated in the meniscus MN during an ejection period tends to reach the unit period Tu following the ejection period. Therefore, in such a case, the above-mentioned effect can be remarkably obtained by providing a period during which none of the ejection pulse PA1, PA2, PB2 and the non-ejection pulse PB1 is supplied to the drive element 51*e*.

Further, as described above, in a case in which the natural vibration cycle Tm of the meniscus of the ink in the nozzle N is 40 μsec or more and 120 μsec or less, the predetermined time length t is an integral multiple or more of the time length of 20 μsec or more and 60 μsec or less. By setting the predetermined time length t in this way, the effect of reducing the unintentional vibration of the meniscus MN described above can be obtained.

Further, as described above, in a case in which the cycle (predetermined cycle) of the unit period Tu is equal to or less than the natural vibration cycle Tm of the meniscus MN of the ink in the nozzle N, the vibration generated in the meniscus MN during an ejection period reaches the unit period Tu following the ejection period. Therefore, in such a case, the above-mentioned effect can be remarkably obtained by providing a period during which none of the ejection pulse PA1, PA2, PB2 and the non-ejection pulse PB1 is supplied to the drive element 51*e*.

Further, as described above, in a case in which Lm/L>0.3, the ink in the nozzle N can be suitably agitated by supplying the non-ejection pulse PB1 to the drive element 51*e*, where L is the length of the nozzle N, and Lm is a distance between the position of the meniscus MN, of the ink, most drawn into the nozzle N by supplying the non-ejection pulse PB1 to the drive element 51*e* and the distal end of the nozzle N.

Further, as described above, the nozzle N has the first portion NP1 and the second portion NP2 provided between the first portion NP1 and the communication flow path Nf. The cross-sectional area of the first portion NP1 is smaller than the cross-sectional area of the second portion NP2. Further, the meniscus MN of the ink in the nozzle N in a state where none of the ejection pulses PA1, PA2, and PB2 and the non-ejection pulse PB1 is supplied to the drive element 51*e* is located in the first portion NP1. On the other hand, the meniscus MN of the ink in the nozzle N in the state where the non-ejection pulse PB1 is supplied to the drive element 51*e* reaches the inside of the second portion NP2. Therefore, even when the nozzle N has the first portion NP1 and the second portion NP2, the ink in the nozzle N can be suitably agitated by supplying the non-ejection pulse PB1 to the drive element 51*e*.

Further, as described above, the nozzle N extends in a direction intersecting the ink flow direction FL of the communication flow path Nf. Therefore, unless the non-ejection pulse PB1 is applied, the ink in the nozzle N is not easily affected by the ink flow in the communication flow path Nf, so that the ink in the nozzle N tends to stay.

Further, as described above, the liquid ejection apparatus 100 includes the plurality of individual flow paths IP, the first common liquid chamber R1 and the second common liquid chamber R2, as described above. Each of the plurality of individual flow paths IP has the pressure chamber C, the individual supply flow path Ra1, and the nozzle N. The first common liquid chamber R1 is commonly provided for the plurality of individual flow paths IP, and stores the ink to be supplied to the individual supply flow path Ra1. The second common liquid chamber R2 is commonly provided for the plurality of individual flow paths IP, and stores the ink discharged from the communication flow path Nf.

Here, as described above, the liquid ejection apparatus 100 includes the circulation mechanism 60 that supplies the ink to the first common liquid chamber R1 and collects the ink from the second common liquid chamber R2. Therefore, it is possible for the circulation mechanism 60 to generate a circulating flow of the ink in each individual flow path IP. As a result, the retention of the ink in the nozzle N can be suitably reduced in combination with the circulating flow.

B: Second Embodiment

Hereinafter, the second embodiment of the present disclosure will be described. In the embodiment illustrated below, elements having the same actions and functions as those of the first embodiment will be denoted by the reference numerals used in the description of the first embodiment, and detailed description thereof will be appropriately omitted.

Figure 12:
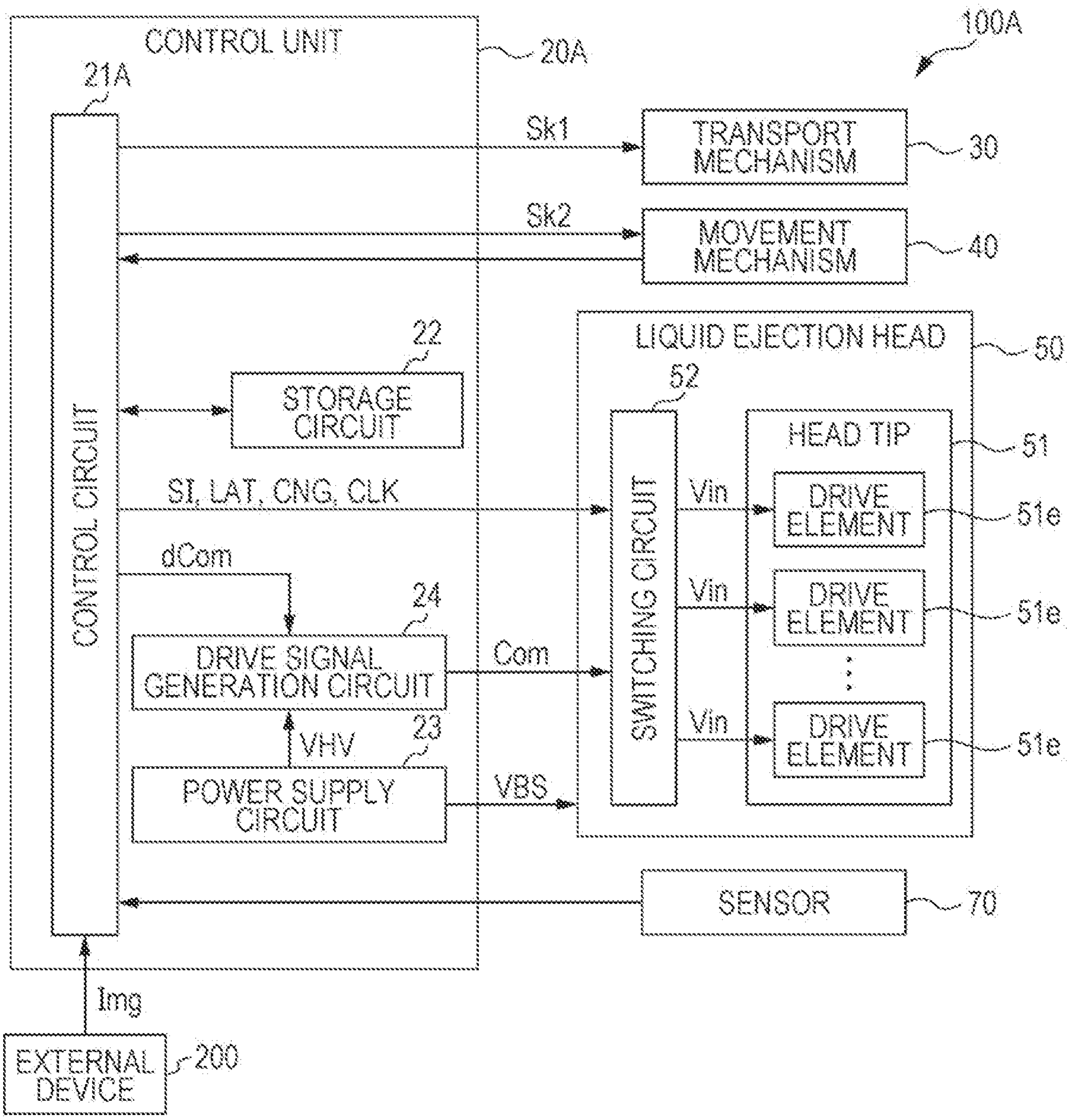
FIG. 12 is a diagram showing an electrical configuration of a liquid ejection apparatus according to the second embodiment.

FIG. 12 is a diagram showing an electrical configuration of a liquid ejection apparatus 100A according to the second embodiment. The liquid ejection apparatus 100A is configured in the same manner as the liquid ejection apparatus 100 of the first embodiment described above, except that a sensor 70 is added and a control unit 20A in place of the control unit 20 is provided.

The sensor 70 is a sensor that measures information about the attenuation coefficient of the flow path from the nozzle N to the ends E1 and E2 of the individual flow path IP. The attenuation coefficient is represented by R/2M when the resistance of the flow path from the nozzle N to the ends E1 and E2 of the individual flow path IP is R and the inertance of the flow path from the nozzle N to the ends E1 and E2 of the individual flow path IP is M. Here, as the viscosity of the ink in the flow path from the nozzle N to the ends E1 and E2 of the individual flow path IP increases, the resistance R increases, so that the attenuation coefficient increases. Therefore, the information about the attenuation coefficient can include, for example, information about the viscosity of the ink in the flow path from the nozzle N to the ends E1 and E2 of the individual flow path IP. That is, the sensor 70 is, for example, a sensor that outputs a signal according to the viscosity of the ink in the flow path from the nozzle N to the ends E1 and E2 of the individual flow path IP.

The change in viscosity of the ink in the flow path from the nozzle N to the ends E1 and E2 of the individual flow path IP can be measures based on, for example, the residual vibration of the ink in the pressure chamber Ca or the pressure chamber Cb and the flight speed of the ink ejected from the nozzle N. Therefore, the sensor 70 outputs, for example, a signal based on the residual vibration of the ink in the pressure chamber Ca or the pressure chamber Cb and a signal based on the flight speed of the ink ejected from the nozzle N as a signal corresponding to the viscosity of the ink in the flow path from the nozzle N to the ends E1 and E2 of the individual flow path IP. The signal based on the residual vibration of the ink in the pressure chamber Ca or the pressure chamber Cb and the signal based on the flight speed of the ink ejected from the nozzle N can be obtained by a technique already known.

Further, the change in viscosity of the ink in the flow path from the nozzle N to the ends E1 and E2 of the individual flow path IP can be predicted according to the temperature of the usage environment. Therefore, the sensor 70 may measure, for example, the temperature of the usage environment as information about the attenuation coefficient of the flow path from the nozzle N to the ends E1 and E2 of the individual flow path IP. That is, the sensor 70 may be composed of a temperature sensor.

The control unit 20A is configured in the same manner as the control unit 20 of the first embodiment described above, except that a control circuit 21A, which is an example of a "controller", is provided in place of the control circuit 21. The control circuit 21A is configured in the same manner as the control circuit 21, except that the above-mentioned predetermined time length Th is changed based on the signal from the sensor 70.

The control circuit 21A shortens the predetermined time length Th as the attenuation coefficient increases or the viscosity of the ink in the flow path from the nozzle N to the ends E1 and E2 of the individual flow path IP increases. For example, in a case in which R/2M≤7000 [1/s], the control circuit 21A sets the predetermined time length Th to a predetermined time length Th1 and in a case in which R/2M>7000 [1/s], the control circuit 21A sets the predetermined time length Th to a predetermined time length Th2 shorter than the predetermined time length Th1.

The higher the humidity of the usage environment, the more unlikely the ink in the nozzle N is to dry, and the lower the humidity of the usage environment, the more likely the ink in the nozzle N is to dry. That is, it is preferable that the lower the humidity of the usage environment, the shorter the predetermined time length Th. Therefore, it is also possible to determine the predetermined time length Th based on the attenuation coefficient or the viscosity of the ink and the humidity of the usage environment.

Figure 13:
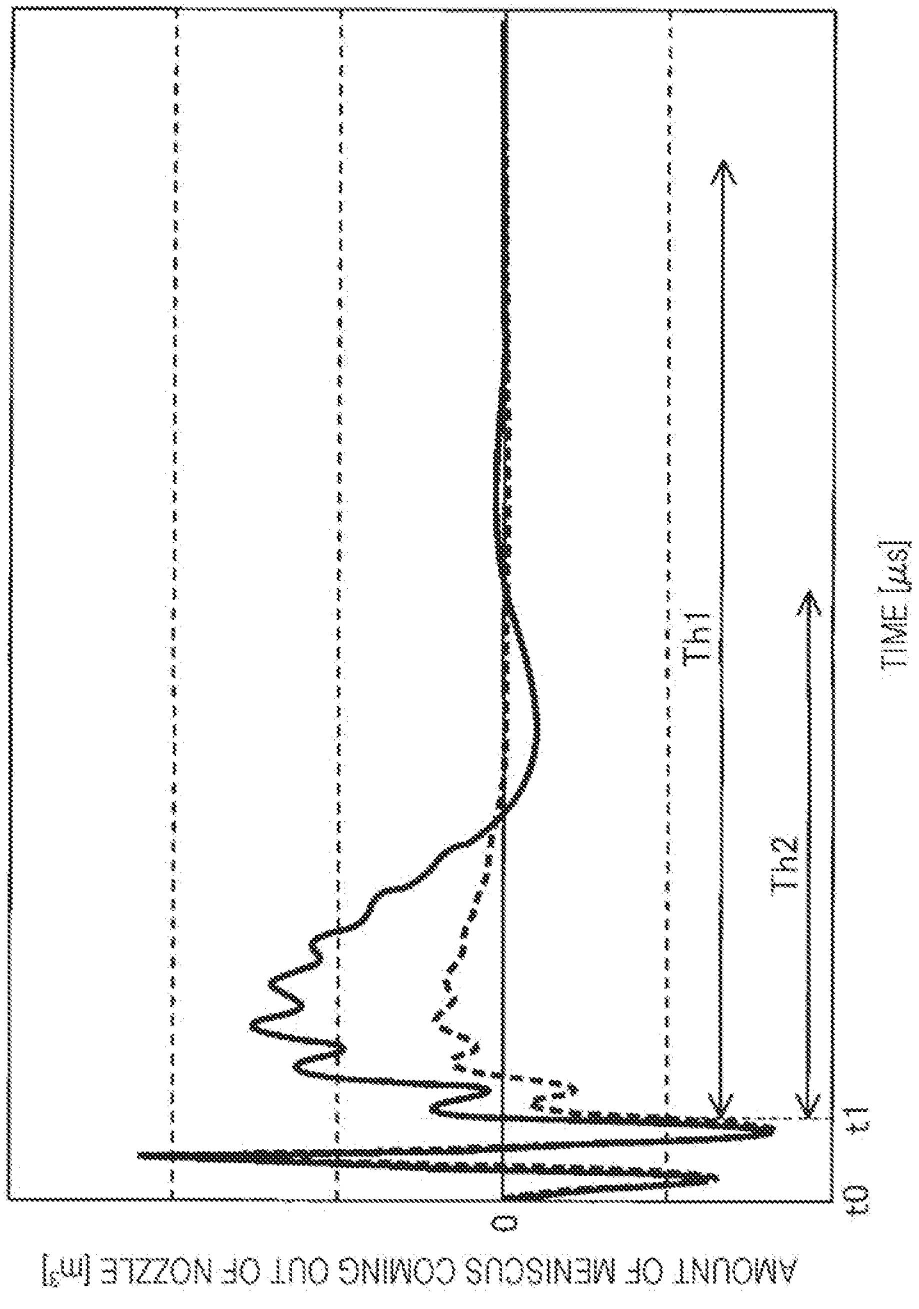
FIG. 13 is a graph showing a change over time in the amount of a meniscus of a liquid emitted from a nozzle after supply of an ejection pulse to a drive element in a case in which an attenuation coefficient of the second flow path changes.

FIG. 13 shows a graph which shows a change with time in the amount of meniscus MN of the ink which comes out from the nozzle N after supplying any of the ejection pulses PA1, PA2, and PB2 to the drive element 51*e* in a case in which the attenuation coefficient of the flow path from the nozzle N to the ends E1 and E2 of the individual flow path IP changes. In FIG. 13, the case in which R/2M≤7000 [1/s] is shown by a solid line, and the case in which R/2M>7000 [1/s] is shown by a broken line.

In the example shown in FIG. 13, in a case in which R/2M≤7000 [1/s], the vibration of the meniscus MN is contained in a period that is three times or more ½ of the natural vibration cycle Tm. On the other hand, in a case in which R/2M>7000 [1/s], the vibration of the meniscus MN is contained in a period that is about one time ½ of the natural vibration cycle Tm. In the example shown in FIG. 13, in a case in which R/2M≤7000 [1/s], the predetermined time length Th1 is set to a period that is three times or more ½ of the natural vibration cycle Tm. On the other hand, in a case in which R/2M>7000 [1/s], the predetermined time length Th2 is set to a period that is one time or more ½ of the natural vibration cycle Tm.

The ejection failure can also be reduced by the above-mentioned second embodiment. In the present embodiment, as described above, the control circuit 21A changes the predetermined time length Th according to the attenuation coefficient of the flow path from the nozzle N to the ends E1 and E2 of the individual flow path IP. Therefore, even when the attenuation coefficient changes, the use period or the non-use period of the non-ejection pulse PB1 can be appropriately set.

Further, the control circuit 21A changes the predetermined time length Th based on the information about the temperature of the usage environment. The temperature of the usage environment correlates with the attenuation coefficient of the flow path from the nozzle N to the ends E1 and E2 of the individual flow path IP. Therefore, it is possible to estimate the change in the attenuation coefficient of the communication flow path Nf based on the information about the temperature of the usage environment. Therefore, it is possible to change the predetermined time length Th based on the information about the temperature of the usage environment.

Here, as described above, the liquid ejection apparatus 100A includes the sensor 70 that outputs a signal according to the viscosity of the ink in the flow path from the nozzle N to the ends E1 and E2 of the individual flow path IP. The control circuit 21A changes the predetermined time length Th based on the output result by the sensor 70. The viscosity of the ink in the flow path from the nozzle N to the ends E1 and E2 of the individual flow path IP correlates with the attenuation coefficient of the flow path from the nozzle N to the ends E1 and E2 of the individual flow path IP. Therefore, it is possible to estimate the change in the attenuation coefficient based on the viscosity. Therefore, it is possible to change the predetermined time length Th based on the viscosity.

C: Third Embodiment

Hereinafter, the third embodiment of the present disclosure will be described. In the embodiment illustrated below, elements having the same actions and functions as those of the first embodiment will be denoted by the reference numerals used in the description of the first embodiment, and detailed description thereof will be appropriately omitted.

Figure 14:
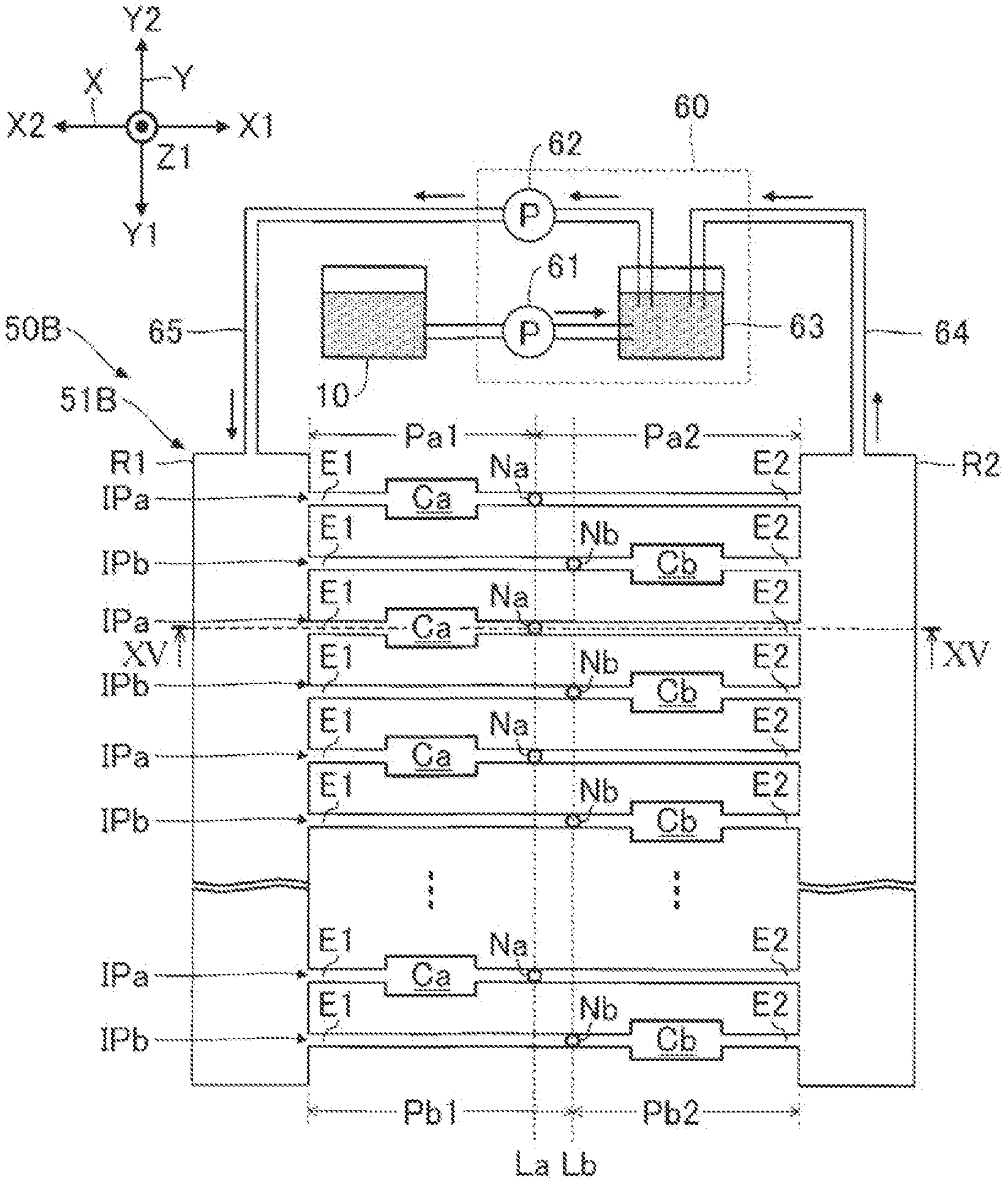
FIG. 14 is a schematic diagram for explaining a circulation flow path of the liquid ejection head according to the third embodiment.

FIG. 14 is a schematic diagram for explaining the circulation flow path of a liquid ejection head 50B according to the third embodiment. The liquid ejection head 50B is the same as the liquid ejection head 50 of the first embodiment described above, except that it has a plurality of individual flow paths IPa and a plurality of individual flow paths IPbs instead of the plurality of individual flow paths IP. That is, as shown in FIG. 14, the liquid ejection head 50B includes the plurality of nozzles N, the plurality of individual flow paths IPa, the plurality of individual flow paths IPbs, the first common liquid chamber R1 and the second common liquid chamber R2, and is coupled to the circulation mechanism 60.

Specifically, the liquid ejection head 50B includes a plurality of nozzles Na and a plurality of nozzles Nb. Each of these nozzles has the same configuration as the nozzle N in the above-described embodiment, and ejects the ink in the Z2 direction. In the following, in a case in which the nozzle Na and the nozzle Nb are not particularly distinguished, they are also simply referred to as the "nozzle N".

The plurality of nozzles Na is disposed along the Y axis, and a set of the nozzles constitutes a first nozzle row La. Similarly, the plurality of nozzles Nb is disposed along the Y axis, and a set of the nozzles constitutes a second nozzle row Lb.

The first nozzle row La and the second nozzle row Lb are disposed with a predetermined distance in the direction along the X axis. Here, the arrangement pitch of the nozzles Na and the arrangement pitch of the nozzles Nb are equal to each other, and the nozzle Na and the nozzle Nb closest to each other are disposed so as to be displaced from each other in the direction along the Y axis.

The individual flow path IPa communicates with each of the plurality of nozzles Na. Each of the plurality of individual flow paths IPa extends along the X axis and communicates with a different nozzle Na. Similarly, the individual flow path IPb communicates with each of the plurality of nozzles Nb. Each of the plurality of individual flow paths IPb extends along the X axis and communicates with a different nozzle Nb. The individual flow paths IPa and the individual flow paths IPb are disposed alternately along the Y axis.

The individual flow path IPa is the same as the individual flow path IP of the above-described embodiment, except that the pressure chamber Cb is omitted. Specifically, the individual flow path IPa includes a first portion Pa1 and a second portion Pa2. The first portion Pa1 of each individual flow path IPa is a flow path between the upstream end E1 and the nozzle Na in the individual flow path IPa. The first portion Pa1 includes the pressure chamber Ca. On the other hand, the second portion Pa2 of each individual flow path IPa is a flow path between the downstream end E2 and the nozzle Na in the individual flow path IPa.

The individual flow path IPb is the same as the individual flow path IP of the above-described embodiment, except that the pressure chamber Ca is omitted. Specifically, the individual flow path IPb includes a third portion Pb1 and a fourth portion Pb2. The third portion Pb1 of each individual flow path IPb is a flow path between the upstream end E1 and the nozzle Nb in the individual flow path IPb. On the other hand, the fourth portion Pb2 of each individual flow path IPb is a flow path between the downstream end E2 and the nozzle Nb in the individual flow path IPb. The fourth portion Pb2 includes the pressure chamber Cb.

The first common liquid chamber R1 is coupled to the upstream end E1 of each individual flow path IPa and the upstream end E1 of each individual flow path IPb. On the other hand, the second common liquid chamber R2 is coupled to the downstream end E2 of each individual flow path IPa and the downstream end E2 of each individual flow path IPb.

Figure 15:
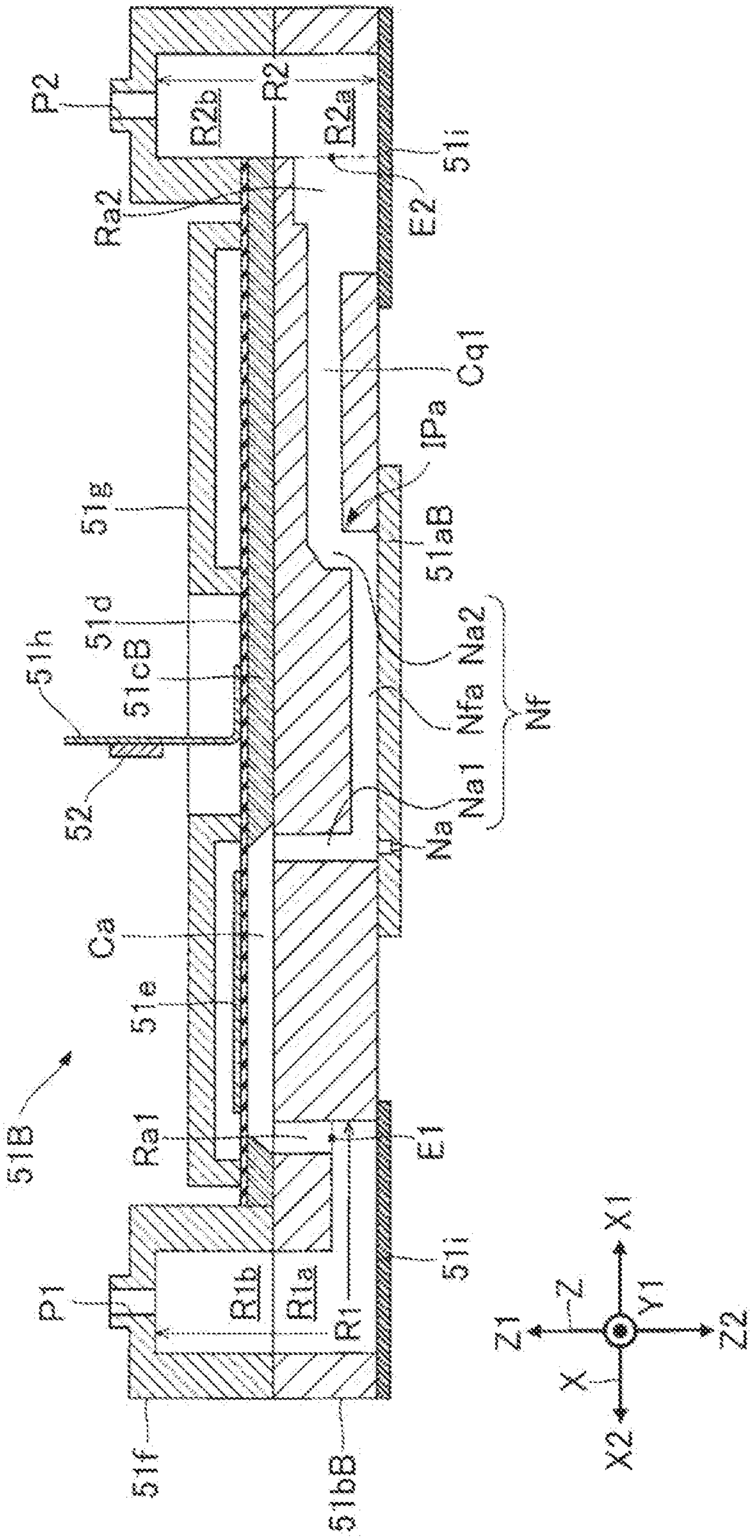
FIG. 15 is a cross-sectional view taken along line XV-XV in FIG. 14.

FIG. 15 is a sectional view taken along line XV-XV in FIG. 14. FIG. 15 shows a cross section of the liquid ejection head 50B cut along the individual flow path IPa in a plane parallel to the X axis and the Z axis. Hereinafter, the configuration related to the individual flow path IPa will be typically described. Since the individual flow path IPb is the same as the individual flow path IPa, except that the orientation is different by 180° around the Z axis, the description thereof will be omitted.

The individual flow path IPa is the same as the individual flow path IP of the first embodiment described above, except that the pressure chamber Cb is replaced with a horizontal communication flow path Cq1. The liquid ejection head 50B is configured in the same manner as the liquid ejection head 50 of the first embodiment described above, except that it includes a nozzle substrate 51*a*B, a flow path substrate 51*b*B, and a pressure chamber substrate 51*c*B in place of the nozzle substrate 51*a*, the flow path substrate 51*b*, and the pressure chamber substrate 51*c*, respectively. In the individual flow path IPa, the drive element 51*e* corresponding to the pressure chamber Cb is omitted.

The nozzle substrate 51*a*B is provided with the plurality of nozzles Na. Here, the nozzle substrate 51*a*B is configured in the same manner as the nozzle substrate 51*a* described above, except that the arrangement of the nozzle Na is different. Here, the nozzle Na overlaps the pressure chamber Ca when viewed in the direction along the Z axis.

The flow path substrate 51*b*B has a portion, of the above-mentioned individual flow path IPa, other than the pressure chamber Ca, and the liquid chamber R1*a* and the liquid chamber R2*a*.

As shown in FIG. 15, each individual flow path IPa has the communication flow path Nf, the horizontal communication flow path Cq1, the individual supply flow path Ra1 and the individual discharge flow path Ra2 in addition to the pressure chamber Ca described above. Of these, the communication flow path Nf, the horizontal communication flow path Cq1, the individual supply flow path Ra1, and the individual discharge flow path Ra2 are provided on the flow path substrate 51*b*B. Here, the first communication flow path Na1 of the communication flow path Nf overlaps the nozzle Na in the direction along the Z axis. Further, the nozzle Na branches off from the first communication flow path Na1 in a direction different from that of the nozzle flow path Nfa.

The horizontal communication flow path Cq1 is a space extending along the X axis. The horizontal communication flow path Cq1 allows the second communication flow path Na2 and the individual discharge flow path Ra2 to communicate with each other, and guides the ink from the second communication flow path Na2 to the individual discharge flow path Ra2.

The pressure chamber substrate 51*c*B is the same as the pressure chamber substrate 51*c* of the above-described embodiment, except that the pressure chamber Cb is omitted from the individual flow path IPa.

Also in the above-mentioned third embodiment, the ejection failure can be reduced by applying the non-ejection pulse during the non-ejection period as in the above-mentioned first embodiment.

D: Modification

Each of the above-exemplified forms can be variously modified. Specific modifications that can be applied to the above-described embodiments are described below. The forms selected from the following modifications can be appropriately combined to the extent that they do not contradict each other.

D1: First Modification

In each of the above-described embodiments, a configuration in which the nozzle N has the first portion NP1 and the second portion NP2 is exemplified, but the nozzle N is not limited to the configuration. For example, the nozzle N may have a constant width or may have a shape having three or more steps.

D2: Second Modification

The drive element that changes the pressure of the ink in the pressure chamber C is not limited to the drive element 51*e* exemplified in each of the above-described embodiments. For example, a heat generating element that fluctuates the pressure of the ink by generating bubbles inside the pressure chamber C by heating may be used as the drive element.

D3: Third Modification

In each of the above-described embodiments, the serial type liquid ejection apparatus 100 that reciprocates the carriage 41 on which the liquid ejection head 50 is mounted is exemplified, but the present disclosure includes the line type liquid ejection apparatus in which a plurality of nozzles N is distributed over the entire width of the medium M.

D4: Fourth Modification

The liquid ejection apparatus 100 illustrated in the above-described embodiments may be used in various devices such as a facsimile machine and a copier, in addition to a device dedicated to printing, and the application of the present disclosure is not particularly limited. The application of the liquid ejection apparatus is not limited to printing. For example, a liquid ejection apparatus that ejects a solution of a color material is used as a manufacturing device that forms a color filter for a display device such as a liquid crystal display panel. Further, a liquid ejection apparatus that ejects a solution of a conductive material is used as a manufacturing device that forms wiring on a wiring substrate and electrodes. Further, a liquid ejection apparatus that ejects a solution of an organic substance related to a living body is used, for example, as a manufacturing device that manufactures a biochip.

What is claimed is:

1. A liquid ejection apparatus comprising:
- a pressure chamber;
- a first flow path through which a liquid is supplied to the pressure chamber;
- a second flow path through which a liquid is discharged from the pressure chamber;
- a nozzle that branches off from the second flow path and ejects a liquid;
- a drive element that is configured to give pressure fluctuations to a liquid in the pressure chamber according to a drive signal;
- a drive signal generation unit that is configured to generate the drive signal; and
- a controller that is configured to control a supply of the drive signal to the drive element so that a target period is either an ejection period during which a liquid is ejected from the nozzle or a non-ejection period during which a liquid is not ejected from the nozzle per unit period of a predetermined cycle based on print data, wherein the drive signal includes
- an ejection pulse that drives the drive element so as to cause, in the pressure chamber, a pressure fluctuation of a strength with which a liquid is ejected from the nozzle and
- a non-ejection pulse that drives the drive element so as to cause, in the pressure chamber, a pressure fluctuation of a strength with which a liquid is not ejected from the nozzle, wherein when a time length that is q times or more ½ of a natural vibration cycle of a meniscus of a liquid in the nozzle is set as a predetermined time length where q is an integer of one or more, the controller
- supplies the ejection pulse to the drive element in a case in which the target period is the ejection period,
- supplies neither the ejection pulse nor the non-ejection pulse to the drive element in a case in which the target period is the non-ejection period and an elapsed time length from the last ejection period before the target period is less than the predetermined time length, and
- dose not supply the ejection pulse but supplies the non-ejection pulse to the drive element in a case in which the target period is the non-ejection period and the elapsed time length is equal to or longer than the predetermined time length.

2. The liquid ejection apparatus according to claim 1, wherein when a period, before the target period, that is n times the predetermined cycle is set as a determination period where n is an integer of one or more, the controller
- determines that the elapsed time length is less than the predetermined time length in a case in which the target period is the non-ejection period and the ejection period is present within the determination period, and
- determines that the elapsed time length is equal to or longer than the predetermined time length in a case in which the target period is the non-ejection period and the ejection period is not present within the determination period.

3. The liquid ejection apparatus according to claim 1, wherein the controller determines that the elapsed time length is equal to or longer than the predetermined time length when the target period is the non-ejection period, the unit period immediately before the target period is the non-ejection period, and the non-ejection pulse is supplied to the drive element during the unit period immediately before the target period.

4. The liquid ejection apparatus according to claim 1, wherein the predetermined cycle is 8 μsec or more and 100 μsec or less.

5. The liquid ejection apparatus according to claim 1, wherein a natural vibration cycle of a meniscus of a liquid in the nozzle is 40 μsec or more and 120 μsec or less.

6. The liquid ejection apparatus according to claim 1, wherein the predetermined cycle is equal to or less than a natural vibration cycle of a meniscus of a liquid in the nozzle.

7. The liquid ejection apparatus according to claim 1, wherein $$Lm/L>0.3$$

where L is a length of the nozzle, and Lm is a distance between a position of a meniscus, of a liquid, most drawn into the nozzle by supplying the non-ejection pulse to the drive element and a distal end of the nozzle.

8. The liquid ejection apparatus according to claim 1, wherein the nozzle has a first portion and a second portion provided between the first portion and the second flow path, wherein a cross-sectional area of the first portion is smaller than a cross-sectional area of the second portion, wherein a meniscus of a liquid in the nozzle in a state where neither the ejection pulse nor the non-ejection pulse is supplied to the drive element is located in the first portion, and wherein a meniscus of a liquid in the nozzle in a state where the non-ejection pulse is supplied to the drive element reaches an inside of the second portion.

9. The liquid ejection apparatus according to claim 1, wherein the nozzle extends in a direction intersecting a direction in which a liquid flows in the second flow path.

10. The liquid ejection apparatus according to claim 1, further comprising:

a plurality of individual flow paths each having the pressure chamber, the first flow path, the second flow path, and the nozzle;

a first common liquid chamber commonly provided for the plurality of individual flow paths and storing a liquid to be supplied to the first flow path; and a second common liquid chamber commonly provided for the plurality of individual flow paths and storing the liquid discharged from the second flow path.

11. The liquid ejection apparatus according to claim 10, further comprising:

a circulation mechanism that supplies a liquid to the first common liquid chamber and collects a liquid from the second common liquid chamber.

12. The liquid ejection apparatus according to claim 1, wherein the controller changes the predetermined time length according to an attenuation coefficient of the second flow path.

13. The liquid ejection apparatus according to claim 1, wherein the controller changes the predetermined time length based on information about one or both of a temperature and humidity of a usage environment.

14. The liquid ejection apparatus according to claim 1, further comprising:

a sensor that is configured to outputs a signal according to a viscosity of a liquid in the second flow path or the nozzle, wherein the controller changes the predetermined time length based on an output result by the sensor.

* * * * *